United States Patent
Sugiyama et al.

(10) Patent No.: US 9,966,607 B2
(45) Date of Patent: May 8, 2018

(54) HIGH-MOLECULAR COMPOUND, INTERMEDIATE COMPOSITION, NEGATIVE ELECTRODE, ELECTRICAL STORAGE DEVICE, SLURRY FOR NEGATIVE ELECTRODE METHOD FOR PRODUCING HIGH-MOLECULAR COMPOUND, AND METHOD FOR PRODUCING NEGATIVE ELECTRODE

(71) Applicant: KABUSHIKI KAISHA TOYOTA JIDOSHOKKI, Kariya-shi, Aichi-ken (JP)

(72) Inventors: Yusuke Sugiyama, Kariya (JP); Nobuhiro Goda, Kariya (JP); Masakazu Murase, Kariya (JP); Takeshi Kondo, Kariya (JP); Yuta Kawamoto, Kariya (JP); Tomokuni Abe, Kariya (JP); Yuta Nakagawa, Kariya (JP); Jun Kaneda, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days. days.

(21) Appl. No.: 15/519,977

(22) PCT Filed: Oct. 20, 2015

(86) PCT No.: PCT/JP2015/079607
§ 371 (c)(1),
(2) Date: Apr. 18, 2017

(87) PCT Pub. No.: WO2016/063882
PCT Pub. Date: Apr. 28, 2016

(65) Prior Publication Data
US 2017/0324094 A1    Nov. 9, 2017

(30) Foreign Application Priority Data

Oct. 21, 2014 (JP) .................. 2014-214580
Jun. 5, 2015 (JP) .................. 2015-114804

(51) Int. Cl.
| | |
|---|---|
| H01M 4/62 | (2006.01) |
| H01M 10/0525 | (2010.01) |
| C08F 8/32 | (2006.01) |
| C09D 133/02 | (2006.01) |
| C09D 5/24 | (2006.01) |
| H01M 4/38 | (2006.01) |
| H01M 4/48 | (2010.01) |
| H01M 4/02 | (2006.01) |
| C08F 8/48 | (2006.01) |
| H01G 11/38 | (2013.01) |
| H01M 4/133 | (2010.01) |
| H01M 4/134 | (2010.01) |
| H01M 4/04 | (2006.01) |
| H01M 4/587 | (2010.01) |

(52) U.S. Cl.
CPC ............... *H01M 4/622* (2013.01); *C08F 8/32* (2013.01); *C08F 8/48* (2013.01); *C09D 5/24* (2013.01); *C09D 133/02* (2013.01); *H01G 11/38* (2013.01); *H01M 4/0404* (2013.01); *H01M 4/0471* (2013.01); *H01M 4/133* (2013.01); *H01M 4/134* (2013.01); *H01M 4/386* (2013.01); *H01M 4/483* (2013.01); *H01M 4/587* (2013.01); *H01M 10/0525* (2013.01); *H01M 2004/027* (2013.01); *Y02E 60/13* (2013.01)

(58) Field of Classification Search
None
See application file for complete search history.

(56) References Cited

U.S. PATENT DOCUMENTS

| | | | |
|---|---|---|---|
| 2007/0087267 A1* | 4/2007 | Kim .................... | H01M 4/0404 429/217 |
| 2009/0136845 A1 | 5/2009 | Choi et al. | |

(Continued)

FOREIGN PATENT DOCUMENTS

| | | |
|---|---|---|
| CN | 102959786 A | 3/2013 |
| CN | 103053048 A | 4/2013 |

(Continued)

OTHER PUBLICATIONS

Written Opinion dated Jan. 19, 2016 in application No. PCT/JP2015/079607.
International Search Report of PCT/JP2015/079607 dated Jan. 19, 2016 [PCT/ISA/210].
Communication dated Aug. 21, 2017, from German Patent and Trademark Office in counterpart application No. 11 2015 004 779.4.
Communication dated Feb. 27, 2018 from the State Intellectual Property Office of the P.R.C. in counterpart Application No. 201580056342.8.

*Primary Examiner* — Tanisha Diggs
(74) *Attorney, Agent, or Firm* — Sughrue Mion, PLLC

(57) ABSTRACT

A polymer compound for use as a binder for a negative electrode of an electrical storage device is formed by condensing polyacrylic acid and a multifunctional amine represented by the following formula (1), in which Y represents a straight chain alkyl group having 1 to 4 carbon atoms, a phenylene group, or an oxygen atom, and R1 and R2 each independently represent one or more hydrogen atoms, methyl groups, ethyl groups, trifluoromethyl groups, or methoxy groups.

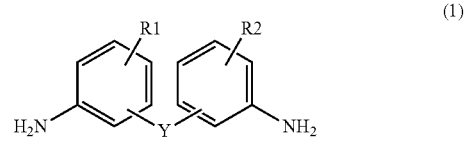

(1)

6 Claims, No Drawings

(56) References Cited

U.S. PATENT DOCUMENTS

| | | |
|---|---|---|
| 2013/0089776 A1 | 4/2013 | Wata et al. |
| 2013/0184385 A1 | 7/2013 | Ogihara |
| 2013/0273423 A1 | 10/2013 | Jeong et al. |
| 2013/0323587 A1* | 12/2013 | Kose ................. H01M 4/386 429/211 |
| 2014/0154562 A1* | 6/2014 | Fukuchi ............ H01M 10/052 429/211 |
| 2014/0312268 A1* | 10/2014 | Lim .................... H01M 4/622 252/182.1 |

FOREIGN PATENT DOCUMENTS

| | | |
|---|---|---|
| JP | H8-213289 A | 8/1996 |
| JP | 2003-003031 A | 1/2003 |
| JP | 2006-278303 A | 10/2006 |
| JP | 2009-080971 A | 4/2009 |
| JP | 2009-135103 A | 6/2009 |
| JP | 2009-256570 A | 11/2009 |
| JP | 2013-131368 A | 7/2013 |
| JP | 2014-110234 A | 6/2014 |
| JP | 2015103449 * | 6/2015 |
| WO | 2010/098380 A1 | 9/2010 |

\* cited by examiner

HIGH-MOLECULAR COMPOUND, INTERMEDIATE COMPOSITION, NEGATIVE ELECTRODE, ELECTRICAL STORAGE DEVICE, SLURRY FOR NEGATIVE ELECTRODE METHOD FOR PRODUCING HIGH-MOLECULAR COMPOUND, AND METHOD FOR PRODUCING NEGATIVE ELECTRODE

CROSS REFERENCE TO RELATED APPLICATIONS

This application is a National Stage of International Application No. PCT/JP2015/079607, filed Oct. 20, 2015, claiming priority based on Japanese Patent Application Nos. 2014-214580, filed Oct. 21, 2014 and 2015-114804, filed Jun. 5, 2015, the contents of all of which are incorporated herein by reference in their entirety.

TECHNICAL FIELD

The present invention relates to a polymer compound for use as a binder for a negative electrode of an electrical storage device, an intermediate composition for the polymer compound, a negative electrode, an electrical storage device, a slurry for a negative electrode, a method for producing a polymer compound, and a method for producing a negative electrode.

BACKGROUND ART

Numerous mobile devices such as mobile phones and notebook-sized personal computers are utilized as a product using a rechargeable battery. The rechargeable battery is also attracting attention as a large-sized battery for an electric vehicle.

An electrode of the rechargeable battery is constituted by: a collector made of a metallic material such as copper or aluminum; and an active material layer bound onto the collector. The active material layer generally contains a binding agent as a binder for an electrode for binding an active material to the collector. In recent years, attempts to utilize polyacrylic acid that is an inexpensive polymer compound have been made as a binder for an electrode. Patent Document 1 discloses a binder for an electrode, the binder containing a lithium salt of polyacrylic acid or a sodium salt of polyacrylic acid. Patent Document 2 discloses a binder for an electrode, the binder containing polyacrylic acid and polyethyleneimine. Patent Document 3 discloses a binder for an electrode, the binder containing polyacrylic acid and an amine compound.

PRIOR ART DOCUMENTS

Patent Documents

Patent Document 1: Japanese Laid-Open Patent Publication No. 2009-080971
Patent Document 2: Japanese Laid-Open Patent Publication No. 2009-135103
Patent Document 3: Japanese Laid-Open Patent Publication No. 2003-003031

SUMMARY OF THE INVENTION

Problems that the Invention is to Solve

The present researchers have found that a polymer compound obtained by condensing polyacrylic acid and a multifunctional amine having a specific molecular structure is useful as a binder for a negative electrode of an electrical storage device such as a rechargeable battery. Accordingly, the present invention intends to provide a polymer compound useful as a binder for a negative electrode of an electrical storage device, an intermediate composition for obtaining the polymer compound, a negative electrode using the polymer compound as a negative electrode binder, an electrical storage device, and a slurry for a negative electrode. The present invention also intends to provide a method for producing the polymer compound and a method for producing a negative electrode.

Means for Solving the Problems

To achieve the foregoing objective and in accordance with a first aspect of the present invention, a polymer compound for use as a binder for a negative electrode of an electrical storage device is provided. The polymer compound is a compound obtained by condensing polyacrylic acid and a multifunctional amine represented by the following formula (1). Y represents a straight chain alkyl group having 1 to 4 carbon atoms, a phenylene group, or an oxygen atom. R1 and R2 each independently represent one or more hydrogen atoms, methyl groups, ethyl groups, trifluoromethyl groups, or methoxy groups.

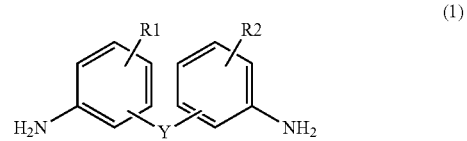

(1)

The polymer compound preferably has an acid anhydride structure.

To achieve the foregoing objective and in accordance with a second aspect of the present invention, a polymer compound for use as a binder for a negative electrode of an electrical storage device is provided. The polymer compound includes a chain structure constituted by polyacrylic acid and a crosslinked structure connecting carboxylic acid side chains within the chain structure or between the chain structures. The crosslinked structure includes at least one crosslinked structure selected from the group consisting of the following formulas (2) to (4). PAA represents the chain structure constituted by polyacrylic acid, X represents a structure represented by the following formula (5). Y represents a straight chain alkyl group having 1 to 4 carbon atoms, a phenylene group, or an oxygen atom. R1 and R2 each independently represent one or more hydrogen atoms, methyl groups, ethyl groups, trifluoromethyl groups, or methoxy groups.

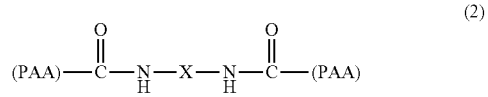

(2)

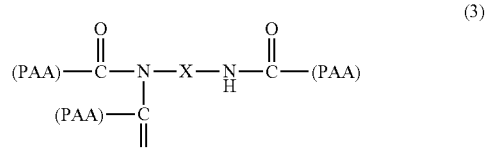

(3)

-continued

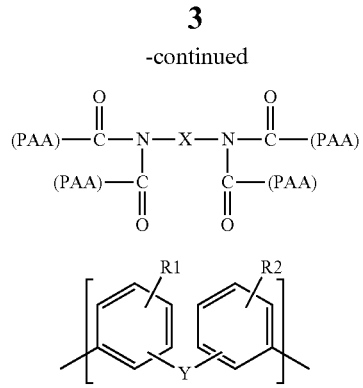

The polymer compound preferably includes, as the crosslinked structure, at least the crosslinked structure represented by the formula (2) and the crosslinked structure represented by the formula (4), or at least the crosslinked structure represented by the formula (3).

The polymer compound preferably has an acid anhydride structure.

To achieve the foregoing objective and in accordance with a third aspect of the present invention, an intermediate composition for a polymer compound for use as a binder for a negative electrode of an electrical storage device is provided. The intermediate composition includes polyacrylic acid, a multifunctional amine represented by the following formula (1), and a nonaqueous solvent. Y represents a straight chain alkyl group having 1 to 4 carbon atoms, a phenylene group, or an oxygen atom. R1 and R2 each independently represent one or more hydrogen atoms, methyl groups, ethyl groups, trifluoromethyl groups, or methoxy groups.

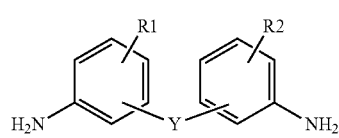

In the above described intermediate composition, a compounding ratio of the polyacrylic acid and the multifunctional amine is preferably made such that carboxy groups in the polyacrylic acid is 15 equivalents or less in relation to 1 equivalent of amino groups in the multifunctional amine.

In the above described intermediate composition, a compounding ratio of the polyacrylic acid and the multifunctional amine is preferably made such that carboxy groups in the polyacrylic acid is 1.5 to 15 equivalents in relation to 1 equivalent of amino groups in the multifunctional amine.

To achieve the foregoing objective and in accordance with a fourth aspect of the present invention, a method for producing the above described polymer compound is provided. The method includes heating polyacrylic acid and a multifunctional amine represented by the following formula (1) at a temperature of 150° C. to 230° C. Y represents a straight chain alkyl group having 1 to 4 carbon atoms, a phenylene group, or an oxygen atom. R1 and R2 each independently represent one or more hydrogen atoms, methyl groups, ethyl groups, trifluoromethyl groups, or methoxy groups.

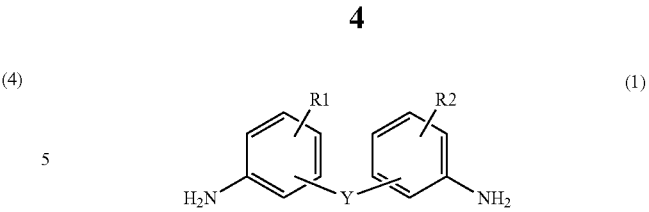

To achieve the foregoing objective and in accordance with a fifth aspect of the present invention, a method for producing a polymer compound is provided. The method includes preheating the above described intermediate composition at a temperature of 40° C. to 140° C., and thereafter heating the intermediate composition at a temperature of 150° C. to 230° C.

To achieve the foregoing objective and in accordance with a sixth aspect of the present invention, a method for producing a polymer compound is provided. The method includes heating polyacrylic acid and a multifunctional amine represented by the following formula (1) at a temperature of 180° C. to 230° C. Y represents a straight chain alkyl group having 1 to 4 carbon atoms, a phenylene group, or an oxygen atom. R1 and R2 each independently represent one or more hydrogen atoms, methyl groups, ethyl groups, trifluoromethyl groups, or methoxy groups.

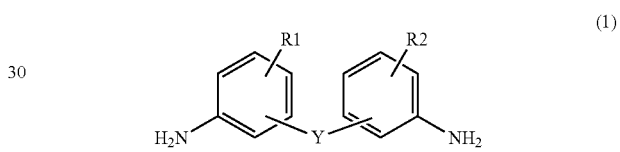

To achieve the foregoing objective and in accordance with a seventh aspect of the present invention, a method for producing a polymer compound is provided. The method includes preheating the above described intermediate composition at a temperature of 40° C. to 140° C., and thereafter heating the intermediate composition at a temperature of 180° C. to 230° C.

To achieve the foregoing objective and in accordance with an eighth aspect of the present invention, a negative electrode of an electrical storage device is provided. The negative electrode includes a binder for a negative electrode, including the above described polymer compound, and a negative electrode active material. The negative electrode active material is at least one selected from carbon-based materials capable of intercalating and deintercalating lithium, elements capable of producing alloy with lithium, and compounds including an element capable of producing alloy with lithium.

In the above described negative electrode, the negative electrode active material is preferably at least one selected from: silicon materials obtained from $CaSi_2$ through decalcification reaction; Si; and $SiO_v$ ($0<v<2$).

To achieve the foregoing objective and in accordance with a ninth aspect of the present invention, an electrical storage device is provided that includes the above described negative electrode and a nonaqueous electrolyte.

To achieve the foregoing objective and in accordance with a tenth aspect of the present invention, a slurry for a negative electrode for use in producing a negative electrode of an electrical storage device is provided. The slurry includes the above described intermediate composition, a negative electrode active material, and a solvent. The negative electrode active material is at least one selected from carbon-based materials capable of intercalating and deintercalating lithium, elements capable of producing alloy with lithium, and compounds including an element capable of producing alloy with lithium.

The above described slurry for a negative electrode preferably includes acetylene black, and the acetylene black preferably has a 50% particle diameter in a range of 0.35 to 0.75 μm.

To achieve the foregoing objective and in accordance with an eleventh aspect of the present invention, a method for producing a negative electrode of an electrical storage device is provided. The method includes forming a negative electrode active material layer to a collector using the above described slurry for a negative electrode.

In the above described method for producing a negative electrode, the slurry for a negative electrode preferably includes at least one selected from: silicon materials obtained from $CaSi_2$ through decalcification reaction; Si; and $SiO_v$ (0<v<2).

To achieve the foregoing objective and in accordance with a twelfth aspect of the present invention, a binder for a negative electrode is provided. The binder includes the above described polymer compound.

To achieve the foregoing objective and in accordance with a thirteenth aspect of the present invention, a method for producing a negative electrode of an electrical storage device is provided. The method includes an active material layer-forming step of forming a negative electrode active material layer on a collector using a mixture including an intermediate composition and a negative electrode active material, and a condensation step of condensing a polyacrylic acid and a multifunctional amine by heat-treating the negative electrode active material layer.

The above described producing method preferably includes drying and heat-treating the negative electrode active material layer in the condensation step.

To achieve the foregoing objective and in accordance with a fourteenth aspect of the present invention, a polymer compound is provided that includes a first crosslinked structure derived from the multifunctional amine represented by the formula (1), and a second crosslinked structure derived from an additional multifunctional amine.

To achieve the foregoing objective and in accordance with a fifth aspect of the present invention, a polymer compound for use as a binder for a negative electrode of an electrical storage device is provided. The polymer compound is a compound obtained by condensing polyacrylic acid, a multifunctional amine represented by the following formula (1), and a multifunctional carboxylic acid.

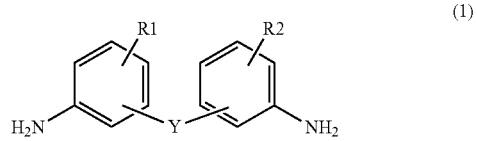

(1)

It is preferable that the polymer compound further have a crosslinked structure derived from both the multifunctional amine represented by the formula (1) and the multifunctional carboxylic acid.

Effects of the Invention

According to the present invention, properties of an electrical storage device are improved.

Modes for Carrying Out the Invention

Embodiments of the present invention will be described in detail below.

A polymer compound according to the present embodiment is a compound obtained by condensing polyacrylic acid (A) and a multifunctional amine (B).

The polyacrylic acid (A) is a homopolymer of acrylic acid. The weight average molecular weight of the polyacrylic acid is not particularly limited and is preferably in a range of, for example, 10,000 to 2,000,000, more preferably in a range of 25,000 to 1,800,000, and still more preferably in a range of 50,000 to 1,500,000.

In the case where a conventional polymer compound such as polyamide-imide is used as a binder for a negative electrode, there is a tendency that the cyclability of an electrical storage device is lowered as the weight average molecular weight of the polymer compound is lowered. In contrast, in the case where the polymer compound according to the present embodiment is used as a binder for a negative electrode, the cyclability of an electrical storage device is maintained even when the weight average molecular weight of polyacrylic acid that constitutes the polymer compound is lowered. Therefore, polyacrylic acid having a low molecular weight of, for example, 250,000 or lower, or 100,000 or lower is suitably used as the polyacrylic acid (A).

The multifunctional amine is a compound having a structure represented by the following formula (1).

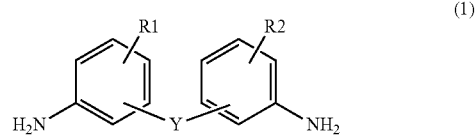

(1)

In formula (1), Y represents a straight chain alkyl group having 1 to 4 carbon atoms, a phenylene group, or an oxygen atom. The binding position of Y in each benzene ring may be an ortho position, a meta position, or a para position to an amino group.

In the case where Y represents a straight chain alkyl group or a phenylene group, a substituent may be bound to a carbon atom that constitutes the structure of Y. Examples of the substituent to be bound to a carbon atom that constitutes the straight chain alkyl group include a methyl group, an ethyl group, a fluoromethyl group, a difluoromethyl group, a trifluoromethyl group, a methoxy group, an ethoxy group, and an oxo group. One or more of these substituents may be bound. The number of substituents to be bound to one carbon atom may be one or two. Furthermore, the substituent to be bound to a carbon atom that constitutes the straight chain alkyl group or the phenylene group may be an amino group or a substituent containing an amino group, and in that case, the multifunctional amine is a multifunctional amine having 3 or more amino groups.

In formula (1), R1 and R2 each independently represent one or more hydrogen atoms, methyl groups, ethyl groups, trifluoromethyl groups, or methoxy groups. In the case where R1 represents a methyl group, an ethyl group, a trifluoromethyl group, or a methoxy group, the binding position of R1 may be any of an ortho position, a meta position, or a para position to an amino group. The same applies to R2.

Specific examples of the multifunctional amine (B) will be described.

Examples of the multifunctional amine in which Y represents a straight chain alkyl group include 3,3'-diaminodiphenylmethane, 4,4'-diaminodiphenylmethane, 3,4'-diaminodiphenylmethane, 4,4'-ethylene dianiline, 4,4'-diamino-3,3'-dimethyldiphenylmethane, 1,1-bis(4-aminophenyl)cyclohexane, 9,9-bis(4-aminophenyl)fluorene, 2,2'-bis(4-aminophenyl)hexafluoropropane, 4,4'-diaminobenzophenone, 4,4'-methylenebis(2-ethyl-6-methylaniline), and pararosaniline. Examples of the multifunctional amine in which Y represents a phenylene group include 1,3,5-tris(4-aminophenyl)benzene. Examples of the multifunctional amine in which Y represents an oxygen atom include 4,4'-diaminodiphenyl ether. 1,3,5-tris(4-aminophenyl)benzene and pararosaniline are a trifunctional amine having 3 amino groups. The multifunctional amines may be used singly or in combinations of two or more.

The compounding ratio in condensing the polyacrylic acid (A) and the multifunctional amine (B) is set according to the number of amino groups in the multifunctional amine (B). That is, the compounding ratio is set such that the number of carboxy groups in the polyacrylic acid (A) may be larger than the number of amino groups in the multifunctional amine (B). In other words, the compounding ratio is set such that the carboxy groups in the polyacrylic acid (A) may be 1 equivalent or more in relation to 1 equivalent of the amino groups in the multifunctional amine (B). It is preferable that the ratio (carboxy groups/amino groups) of the number of carboxy groups in the polyacrylic acid (A) to the number of amino groups in the multifunctional amine (B) be in a range of 1.5/1 to 15/1, and more preferably in a range of 2/1 to 10/1.

The polymer compound according to the present embodiment is obtained through a mixing step of mixing the polyacrylic acid (A) and the multifunctional amine (B) in a solvent and a heating step of subjecting an intermediate composition obtained in the mixing step to heating treatment.

The mixing step is a step of obtaining a liquid intermediate composition in which the polyacrylic acid (A), the multifunctional amine (B) and a solvent are mixed. As a solvent for use in the mixing step, a solvent that dissolves the polyacrylic acid (A) and the multifunctional amine (B) can be selected and used appropriately. Particularly, it is preferable to use a nonaqueous solvent such as N-methyl-2-pyrrolidone, dimethylformamide, dimethylacetamide, dimethyl sulfoxide, propylene carbonate, γ-butyrolactone, ethanol, and propanol from the viewpoint of improving solubility.

The heating step is a step of condensing the polyacrylic acid (A) and the multifunctional amine (B), both of which are contained in the intermediate composition, by subjecting the intermediate composition to heating treatment. It is preferable that the heating temperature in the heating step be in a range of 150 to 230° C. from the viewpoint of facilitating the formation of the crosslinked structure, namely from the viewpoint of effective formation of an amide bond moiety or an imide bond moiety, and more preferably in a range of 180 to 200° C. It is preferable that the heating temperature in the heating step be in a range of 180 to 230° C. from the viewpoint of forming an acid anhydride structure, which will be mentioned later. When the heating temperature is raised, a property (cyclability) of an electrical storage device such as a rechargeable battery is enhanced in the case where the polymer compound according to the present embodiment is used as a binder for a negative electrode.

When the intermediate composition is heated, a catalyst may be added to the intermediate composition to make the condensation reaction for forming an amide bond and an imide bond to progress or to increase the reaction rate of the condensation reaction. As the catalyst, a dehydration condensation catalyst such as, for example, 1-methylimidazole, 2-methylimidazole, N,N'-dicyclohexylcarbodiimide, N,N'-carbonyldiimidazole, N,N'-diisopropylcarbodiimide, 1-[3-(dimethylamino)propyl]-3-ethylcarbodiimide, 1-ethyl-3-(3-dimethylaminopropyl)carbodiimide hydrochloride, diphenylphosphoryl azide, and a BOP reagent can be used effectively. In the case where these catalysts are added, the amide bond and the imide bond can be formed at a lower temperature, and therefore the production efficiency of the polymer compound can be enhanced.

It is preferable that the intermediate composition to be subjected to the heating step be an intermediate composition to which preheating treatment has been conducted. It is preferable that the temperature in the preheating treatment be in a range of 40 to 140° C., and more preferably 60 to 130° C. By the preheating treatment, the polyacrylic acid (A) and the multifunctional amine (B) contained in the intermediate composition associate with each other to form a state where the condensation reaction between a carboxy group and an amino group easily progresses. Thus, the condensation reaction progresses efficiently in the heating step. The condensation reaction between the carboxy group and the amino group may progress partially to form an amide bond moiety and an imide bond moiety by the preheating treatment.

In the case where the intermediate composition to which the preheating treatment has been conducted is used, it is preferable to conduct the heating step in a state where the solvent contained in the intermediate composition is removed. In that case, the condensation reaction of the polyacrylic acid (A) and the multifunctional amine (B) easily progresses.

The polymer compound in which the polyacrylic acid (A) and the multifunctional amine (B) are condensed is obtained through the heating step. It is considered that at least one of the amide bond and the imide bond is formed between a carboxy group in the polyacrylic acid (A) and an amino group in the multifunctional amine (B), so that the polymer compound has a crosslinked structure in which the polyacrylic acids (A) are crosslinked. That is, the polymer compound has a chain structure constituted by the polyacrylic acid and a crosslinked structure connecting carboxylic acid side chains within the chain structure or between the chain structures. The crosslinked structure is at least one crosslinked structure selected from the following formulas (2) to (4).

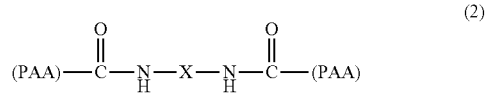

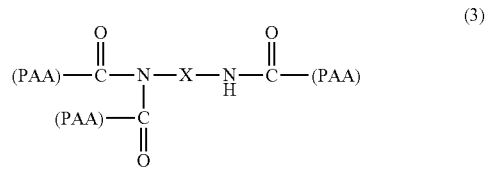

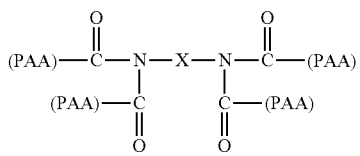

In formulas (2) to (4), PAA represents a chain structure constituted by polyacrylic acid. X represents a structure represented by the following formula (5). In formulas (3) to (4) having an imide structure, the two carbonyl groups that constitute one imide structure may be carbonyl groups each bound to a different chain structure, or may be carbonyl groups each bound to the same chain structure. For example, in the case where the two carbonyl groups that constitute an imide structure are carbonyl groups bound to adjacent carbon atoms in the same chain structure, a maleimide structure is formed as the imide structure.

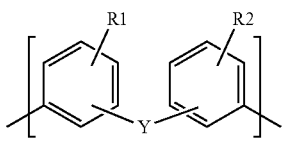

In formula (5), Y represents a straight chain alkyl group having 1 to 4 carbon atoms, a phenylene group, or an oxygen atom. The binding position of Y in each benzene ring may be any of an ortho position, a meta position, and a para position to an amino group. In formula (5), Y has a structure that conforms to Y in formula (1).

In formula (5), R1 and R2 each independently represent one or more hydrogen atoms, methyl groups, ethyl groups, trifluoromethyl groups, or methoxy groups. In the case where R1 represents a methyl group, a trifluoromethyl group, or a methoxy group, the binding position of R1 may be any of an ortho position, a meta position, and a para position to an amino group. The same applies to R2. R1 and R2 in formula (5) have a structure that conforms to R1 and R2 in formula (1), respectively.

It is preferable that the polymer compound have both the amide bond moiety and the imide bond moiety in the crosslinked structure thereof. That is, it is preferable that the polymer compound have at least the crosslinked structure of formula (2) and the crosslinked structure of formula (4), or at least the crosslinked structure of formula (3).

It is preferable that the polymer compound have within the molecular structure thereof an acid anhydride structure (CO—O—CO) formed by two carboxy groups being subjected to dehydration condensation. The acid anhydride structure may be a structure formed in the same chain structure (PAA), or may be a structure formed between different chain structures (PAAs). That is, two carbonyl carbon atoms contained in the acid anhydride structure may be bound to the same chain structure (PAA), or may be bound to a different chain structure (PAA).

The polymer compound according to the present embodiment may be a polymer compound further having a second crosslinked structure.

For example, the polymer compound further having a second crosslinked structure may be a polymer compound obtained by condensing the polyacrylic acid (A), the multifunctional amine (B) represented by formula (1), and an additional multifunctional amine (C). In that case, the polymer compound has the crosslinked structure derived from the multifunctional amine represented by formula (1) and further having the second crosslinked structure derived from the additional multifunctional amine. By adding the second crosslinked structure, the physical properties such as strength and flexibility of the polymer compound can be adjusted.

Examples of the additional multifunctional amine (C) include 1,4-diaminobutane, 1,6-diaminohexane, 1,8-diaminooctane, 2-aminoaniline (1,2-phenylenediamine), 3-aminoaniline (1,3-phenylenediamine), 4-aminoaniline (1,4-phenylenediamine), 2,4-diaminopyridine, 2,5-diaminopyridine, 2,6-diaminopyridine, and 1,3-diiminoisoindoline.

It is preferable that the compounding ratio of the additional multifunctional amine (C) be 1 part by mass or less in relation to 10 parts by mass of the multifunctional amine (B) represented by formula (1). By setting the compounding ratio as described above, the polymer compound is prevented from becoming unsuitable as a negative electrode binder due to great changes in the physical properties such as strength and flexibility of the polymer compound.

The polymer compound further having the second crosslinked structure may be a polymer compound obtained by condensing the polyacrylic acid (A), the multifunctional amine (B) represented by formula (1), and a multifunctional carboxylic acid (D). In that case, the polymer compound has the crosslinked structure derived from the multifunctional amine represented by formula (1) and further has the second crosslinked structure derived from both the multifunctional amine represented by formula (1) and the multifunctional carboxylic acid. The second crosslinked is such that: it is made of two or more multifunctional amines (B) represented by formula (1) and one or more multifunctional carboxylic acids (D) bound by the amide bond or the imide bond; a structural moiety derived from the multifunctional amine (B) represented by formula (1) and a structural moiety derived from the multifunctional carboxylic acid (D) are alternately positioned; and the structural moiety positioned at a terminal and derived from the multifunctional amine (B) represented by formula (1) is bound to the polyacrylic acid (A). By adding the second crosslinked structure, the physical properties such as strength and flexibility of the polymer compound can be adjusted.

The multifunctional carboxylic acid (D) may be a compound having two or more carboxy groups. Examples of the multifunctional carboxylic acid (D) include oxalic acid, 1,2,3-propanetricarboxylic acid, 1,2,3,4-butanetetracarboxylic acid, diglycollic acid, phthalic acid, trimellitic acid, pyromellitic acid, 1,4-naphthalenedicarboxylic acid, 1,8-naphthalenedicarboxylic acid, 2,6-naphthalenedicarboxylic acid, 2,2'-biphenyldicarboxylic acid, 3,3'-biphenyldicarboxylic acid, 4,4'-biphenyldicarboxylic acid, 1,4-cyclohexanedicarboxylic acid, 1,2-cyclohexanedicarboxylic acid, 1,2,4-cyclohexanetricarboxylic acid, 1,3,5-cyclohexanetricarboxylic acid, 1,2,4,5-cyclohexanetetracarboxylic acid, 1,2,3,4,5,6-cyclohexanehexacarboxylic acid, 1,3-adamantanedicarboxylic acid, 1,2-cyclopentanedicarboxylic acid, 1,3-cyclopentanedicarboxylic acid, 1,1,3-cyclopentanetricarboxylic acid, 1,2,4-cyclopentanetricarboxylic acid, 1,3,4-cyclopentanetricarboxylic acid, 2,3,4,5-tetrahydrofurantetracarboxylic acid, bicyclo[2.2.2]oct-7-ene-2,3,5,6-tetracarboxylic dianhydride, and 3,4,9,10-perylenetetracarboxylic dianhydride.

It is preferable that the compounding ratio of the multifunctional carboxylic acid (D) be a compounding ratio in a range of 7 to 25 in terms of the ratio (number of amino groups/number of carboxy groups) of the number of amino groups in the multifunctional amine (B) represented by formula (1) to the number of carboxy groups in the multifunctional carboxylic acid (D), and more preferably a compounding ratio in a range of 5 to 15.

The polymer compound according to the present embodiment may be a polymer compound having as the second crosslinked structure both the second crosslinked structure derived from the additional multifunctional amine and the second crosslinked structure derived from both the multifunctional amine represented by formula (1) and the multifunctional carboxylic acid.

The polymer compound according to the present embodiment may be a polymer compound having a structure to which a monoamine is bound. That is, the polymer compound may be a polymer compound obtained by condensing the polyacrylic acid (A), the multifunctional amine (B) represented by formula (1), and the monoamine (E). The monoamine binds to a carboxy group that is not bound to the multifunctional amine in the polyacrylic acid to construct a non-crosslinked structure.

Examples of the monoamine (E) include aniline, aminophenol, morpholine, and 3-aminopyridine. It is preferable that the compounding ratio of the monoamine (E) be 1 part by mass or less in relation to 10 parts by mass of the multifunctional amine (B) represented by formula (1). By setting the compounding ratio as described above, the polymer compound is prevented from becoming unsuitable as a negative electrode binder due to great changes in the physical properties such as strength and flexibility of the polymer compound.

Next, an example of the method for producing a negative electrode using the polymer compound according to the present embodiment as a binder for a negative electrode will be described.

First, a slurry is prepared by mixing a negative electrode active material, a binder for a negative electrode, and a solvent. When the slurry is prepared, an additional component such as a conductive aid may further be mixed if necessary.

As the negative electrode active material, known materials for use as a negative electrode active material of an electrical storage device such as a rechargeable battery, for example, carbon-based materials, elements capable of producing alloy with lithium, and compounds containing an element capable of producing alloy with lithium, can be used.

As the carbon-based material, for example, carbon-based materials capable of intercalating and deintercalating lithium can be used, and specific examples thereof include hardly graphitizable carbon, natural graphite, artificial graphite, cokes, graphites, glassy carbons, organic polymer compound-sintered bodies, carbon fibers, active carbon, and carbon blacks.

Examples of the element capable of producing alloy with lithium include Na, K, Rb, Cs, Fr, Be, Mg, Ca, Sr, Ba, Ra, Ti, Ag, Zn, Cd, Al, Ga, In, Si, Ge, Sn, Pb, Sb, and Bi. Among these, Si is particularly preferable.

Examples of the compound containing an element capable of producing alloy with lithium include compounds containing an element selected from Na, K, Rb, Cs, Fr, Be, Mg, Ca, Sr, Ba, Ra, Ti, Ag, Zn, Cd, Al, Ga, In, Si, Ge, Sn, Pb, Sb, and Bi. Among these, silicon-based materials that are compounds containing silicon are particularly preferable.

Examples of the silicon-based material include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<V\leq2$), $SnSiO_3$, and $LiSiO$. Among these, $SiO_v$ ($0<V\leq2$) is particularly preferable.

A silicon material disclosed in International Publication No. WO 2014/080608 and obtained from $CaSi_2$ through decalcification reaction can also be used as the silicon-based material. The silicon material is a silicon material obtained by, for example, subjecting a layered polysilane which is obtained by treating $CaSi_2$ with an acid (for example, hydrochloric acid or hydrogen fluoride) to decalcification (for example, heating treatment at 300 to 1,000° C.). As the negative electrode active material, the above-described materials may be used singly or in combinations of two or more. It is particularly preferable that the polymer compound according to the present embodiment be used in combination with a silicon-based material that is a negative electrode active material for which the degree of expansion and contraction during charge and discharge is large.

As the negative electrode active material, the above-described materials may be used singly or in combinations of two or more.

As a binder for a negative electrode to be mixed with the slurry, the intermediate composition is used.

The binder for a negative electrode may be used together with an additional binder for a negative electrode. Examples of the additional binder for a negative electrode include polyvinylidene fluoride, polytetrafluoroethylene, styrene-butadiene rubber, polyimide, polyamide-imide, carboxymethyl cellulose, polyvinyl chloride, methacrylic resins, polyacrylonitrile, modified polyphenylene oxides, polyethylene oxide, polyethylene, polypropylene, polyacrylic acid, and phenol resins. These additional binders for a negative electrode may be used singly or in combinations of two or more. In the case where the additional binder for a negative electrode is used together, it is preferable that the solid content of the intermediate composition be contained 1% by mass or more in relation to the total solid content of the binder for a negative electrode, and more preferably 10% by mass or more.

The compounding ratio (negative electrode active material:binder for negative electrode) of the negative electrode active material to the binder for a negative electrode in terms of the mass ratio can be set appropriately according to the kind of the negative electrode active material and the binder for a negative electrode. It is preferable that the compounding ratio be in a range of, for example, 5:3 to 99:1, more preferably in a range of 3:1 to 97:3, and still more preferably in a range of 16:3 to 95:5. In the case where the negative electrode active material is the silicon material disclosed in International Publication No. WO 2014/080608, it is preferable that the compounding ratio (negative electrode active material:binder for a negative electrode) of the negative electrode active material to the binder for a negative electrode in terms of the mass ratio be in a range of 3:1 to 7.5:1, and more preferably in a range of 4:1 to 5:1.

As a solvent, known solvents for use in producing an electrode of an electrical storage device such as a rechargeable battery can be used appropriately according to the kind of the negative electrode active material and the binder for a negative electrode. Specific examples of the solvent include N-methyl-2-pyrrolidone, methanol, and methyl isobutyl ketone.

As a conductive aid, known conductive aids for use in negative electrodes for an electrical storage device such as a rechargeable battery can be used. Specific examples of the conductive aid include acetylene black, carbon nanotubes, and Ketjen black. These conductive aids may be used singly or in combinations of two or more.

For example, in the case where acetylene black and a carbon nanotube or Ketjen black are used together, a property (cyclability) of an electrical storage device is more improved than in the case where acetylene black is used alone. In addition, in the case where acetylene black and a carbon nanotube are used together, it is preferable that the compounding ratio (carbon nanotube/acetylene black) of these conductive aids in terms of the mass ratio be in a range of 0.2 to 4.0, and more preferably in a range of 0.2 to 1.0. In the case where acetylene black and Ketjen black are used together, it is preferable that the compounding ratio (Ketjen black/acetylene black) of these conductive aids in terms of the mass ratio be in a range of 0.2 to 1.0.

In the case where acetylene black is used as a conductive aid, it is preferable that the acetylene black have a 50% particle diameter (D50) in a range of 0.35 to 0.75 μm, and it is more preferable that the acetylene black further have a 10% particle diameter (D10) in a range of 0.18 to 0.25 μm and a 90% particle diameter (D90) in a range of 1.6 to 3.5 μm. By setting the particle diameter in the above-described range, the property (cyclability) of an electrical storage device can be improved effectively by acetylene black. In addition, the 50% particle diameter means the secondary particle diameter of acetylene black at an integrated value of 50% in the particle size distribution determined by a laser diffraction/scattering method. The same applies to the 10% particle diameter and the 90% particle diameter.

It is preferable that the compounding ratio of acetylene black be in a range of 0.5 to 1.5 parts by mass in relation to 1 part by mass of the binder for a negative electrode. By setting the compounding ratio in the above-described range, properties (initial efficiency and cyclability) of an electrical storage device can be improved effectively by acetylene black.

In addition, in the case where the conductive aid is contained in a slurry, it is preferable that a dispersant be contained together with the conductive aid. Specific examples of the dispersant include polyvinylpyrrolidone, polyvinyl alcohol, polyvinyl butyral, and triazine compounds. These dispersants may be used singly or in combinations of two or more.

Subsequently, the slurry is applied to a collector to form a negative electrode active material layer made from the slurry on the surface of the collector. Thereafter, solvents (solvent for slurry and solvent contained in the intermediate composition) contained in the negative electrode active material layer are removed, and the negative electrode active material layer is subjected to drying treatment and heating treatment to cure the negative electrode active material layer. By this heating treatment, the polyacrylic acid (A) and the multifunctional amine (B) contained in the intermediate composition are condensed to form the polymer compound according to the present embodiment in the negative electrode active material layer. The heating treatment can be conducted in a state where the solvents are contained in the negative electrode active material layer; however, it is more preferable to conduct the heating treatment in a state where the negative electrode active material layer has been dried.

Specific examples of the drying treatment and the heating treatment include heating methods using a heat source such as hot air, infrared rays, microwaves, or high-frequency waves under normal pressure or reduced pressure. When the heating treatment is conducted, heating from the collector is more preferable than heating from the negative electrode active material layer. In the drying treatment, slow heating at a low temperature is more preferable than quick heating at a high temperature, and in the heating treatment, quick heating at a high temperature is more preferable than slow heating at a low temperature. By heating as such, the properties (initial efficiency and cyclability) of an electrical storage device can be enhanced.

Known metallic materials for use as a collector for a negative electrode of an electrical storage device such as a rechargeable battery can be used as the collector. Specific examples of the metallic material that can be utilized as the collector include silver, copper, gold, aluminum, magnesium, tungsten, cobalt, zinc, nickel, iron, platinum, tin, indium, titanium, ruthenium, tantalum, molybdenum, and stainless steel.

The negative electrode using the polymer compound according to the present embodiment as a binder for a negative electrode can be used effectively for a nonaqueous type electrical storage device including a nonaqueous electrolyte as an electrolyte. Examples of the electrical storage device include rechargeable batteries, electric double layer capacitors, and lithium ion capacitors. These electrical storage devices are useful as a nonaqueous rechargeable battery for driving a motor of electric vehicles and hybrid vehicles or as a nonaqueous rechargeable battery utilized for personal computers, mobile communication devices, home electric appliances, office devices, and industrial devices.

Next, advantages of the present embodiment will be described.

(1) The polymer compound according to the present embodiment is a compound obtained by condensing polyacrylic acid and a multifunctional amine represented by the formula (1). The polymer compound according to the present embodiment has a chain structure constituted by polyacrylic acid and a crosslinked structure connecting carboxylic acid side chains in the chain structure or between the chain structures, and the crosslinked structure is at least one crosslinked structure selected from the formulas (2) to (4). Furthermore, the polymer compound according to the present embodiment is a compound obtained by subjecting a liquid intermediate composition containing polyacrylic acid, a multifunctional amine represented by the formula (1), and a nonaqueous solvent to heating treatment.

The polymer compound according to the present embodiment is useful as a binder for a negative electrode of an electrical storage device. By using the polymer compound according to the present embodiment as a binder for a negative electrode, the properties (initial efficiency and cyclability) of an electrical storage device can be enhanced.

The polymer compound according to the present embodiment as a binder for a negative electrode has a characteristic by which the cyclability of an electrical storage device is easily maintained even when the weight average molecular weight of the chain structure made from polyacrylic acid is lowered. Therefore, even in the case where the polymer compound is made to have a short chain structure moiety and a low molecular weight, the polymer compound can function effectively as a binder for a negative electrode. In the case where the polymer compound having a low molecular weight is used as a binder for a negative electrode, a slurry can be prepared with a smaller amount of solvent, and therefore the solid content ratio in the slurry can be set large. By setting the solid content ratio in the slurry large, the drying time for volatilizing the solvents from the negative electrode active material layer in producing a negative electrode is shortened to improve the productivity of the negative electrode. Accordingly, in the case where the polymer compound according to the present embodiment is used as a binder for a negative electrode, it is easy to improve the productivity of a negative electrode.

(2) In the partial structure of the crosslinked structure, which is represented by the formula (5), Y represents a straight chain alkyl group having 1 to 4 carbon atoms, a phenylene group, or an oxygen atom.

According to the constitution, the polymer compound has in the crosslinked structure a partial structure that can move, and the elasticity of the polymer compound is improved. Thereby, the binder for a negative electrode using the polymer compound according to the present embodiment becomes easy to follow the change in volume due to the expansion and contraction accompanying the intercalation and deintercalation of lithium or the like. As a result, the properties of an electrical storage device are enhanced.

(3) The polymer compound according to the present embodiment has a site where a carboxy group in polyacrylic acid and an amino group in the multifunctional amine are bound through an amide bond and a site where a carboxy group in polyacrylic acid and an amino group in the multifunctional amine are bound through an imide bond. The polymer compound according to the present embodiment has, as a crosslinked structure, at least a crosslinked structure represented by the formula (2) and a crosslinked structure represented by the formula (4), or at least a crosslinked structure represented by the formula (3).

According to the constitution, in a state of a negative electrode formed by mixing the polymer compound with a negative electrode active material, the strength of the electrode structure is enhanced. Thereby, the electrode structure becomes easy to maintain against the change in volume due to the expansion and contraction accompanying the intercalation and deintercalation of lithium or the like. As a result, the properties of an electrical storage device can be reliably enhanced.

According to the constitution, the solubility of the polymer compound to organic substances such as nonaqueous electrolytes is lowered. Therefore, an effect of suppressing the elution of the polymer compound into the nonaqueous electrolyte during electrochemical reaction is also obtained.

(4) The compounding ratio of polyacrylic acid and the multifunctional amine (multifunctional amine represented by formula (1)) is made such that carboxy groups in the polyacrylic acid is 15 equivalents or less in relation to 1 equivalent of amino groups in the multifunctional amine.

When the equivalent of the carboxy groups to the amino groups is lowered, an imide bond moiety is easily formed as a condensation moiety between a carboxy group and an amino group. Therefore, according to the constitution, the imide bond moiety can be formed efficiently. As a result, the advantage described in (3) can be obtained more reliably.

(5) The compounding ratio of polyacrylic acid and the multifunctional amine (multifunctional amine represented by formula (1)) is made such that the carboxy groups in the polyacrylic acid is 1.5 equivalents or more in relation to 1 equivalent of the amino groups in the multifunctional amine. When the equivalent of the carboxy groups to the amino groups is increased, more crosslinked structures are formed, so that the resin strength of the polymer compound is enhanced. Therefore, according to the constitution, the resin strength achieved by the formation of the crosslinked structure can be reliably improved more.

When the equivalent of the carboxy groups to the amino groups is increased, the carboxy groups not involved in the crosslinked structure increase, so that an acid anhydride structure becomes easily formed.

EXAMPLES

Hereinafter, examples that further substantiate the embodiments will be described.
<Test 1>

Intermediate compositions of Examples 1 to 3 each containing a different multifunctional amine were prepared. Hereinafter, polyacrylic acid is denoted as PAA, N-methyl-2-pyrrolidone is denoted as NMP, and polyamide-imide is denoted as PAI.

Example 1: PAA+4,4'-Diaminodiphenylmethane

PAA having a weight average molecular weight of 800,000 was dissolved in NMP to prepare a 10% by mass PAA/NMP solution, and 7 ml (9.5 mmol in terms of monomer for PAA) of the PAA/NMP solution was taken out and placed in a flask under a nitrogen atmosphere. Separately from the solution, 0.1 g (0.5 mmol) of 4,4'-diaminodiphenylmethane was dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 1 in a state of an NMP solution.

Example 2: PAA+4,4'-Diaminodiphenyl Ether

PAA having a weight average molecular weight of 800,000 was dissolved in NMP to prepare a 10% by mass PAA/NMP solution, and 7 ml of the PAA/NMP solution was taken out and placed in a flask under a nitrogen atmosphere. Separately from the solution, 0.1 g (0.5 mmol) of 4,4'-diaminodiphenyl ether was dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 2 in a state of an NMP solution.

Polymer compounds obtained by condensing PAA and a multifunctional amine not satisfying the formula (1) were synthesized as Reference Examples.

Reference Example 1: PAA+1,6-Diaminohexane

PAA having a weight average molecular weight of 800,000 was dissolved in NMP to prepare a 10% by mass PAA/NMP solution, and 7 ml of the PAA/NMP solution was taken out and placed in a flask under a nitrogen atmosphere. Separately from the solution, 65 µl (0.5 mmol) of 1,6-diaminohexane was dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Reference Example 1 in a state of suspension in NMP.

Reference Example 2:
PAA+2,2'-Oxybis(Ethylamine)

PAA having a weight average molecular weight of 800,000 was dissolved in NMP to prepare a 10% by mass PAA/NMP solution, and 7 ml of the PAA/NMP solution was taken out and placed in a flask under a nitrogen atmosphere. Separately from the solution, 53 µl (0.5 mmol) of 2,2'-oxybis (ethylamine) was dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Reference Example 2 in a state of suspension in NMP.

Reference Example 3:
PAA+2-Methyl-5-Aminoaniline

PAA having a weight average molecular weight of 800,000 was dissolved in NMP to prepare a 10% by mass PAA/NMP solution, and 7 ml of the PAA/NMP solution was taken out and placed in a flask under a nitrogen atmosphere. Separately from the solution, 0.061 g (0.5 mmol) of 2-methyl-5-aminoaniline was dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Reference Example 3 in a state of an NMP solution.

Production of Electrode Sheets

Next, electrode sheets using a polymer compound obtained from each intermediate composition as a binder for a negative electrode were produced using the intermediate compositions of Examples 1 and 2. Lithium ion rechargeable batteries were produced using the obtained electrode sheets, and the battery properties were evaluated for the lithium ion rechargeable batteries.

Slurries were each prepared by mixing 85 parts by mass of SiO, 5 parts by mass of acetylene black, and 10 parts by mass of the NMP solution of the intermediate composition of each of Examples 1 and 2 and adding NMP to the resultant mixture. Each slurry was applied to the surface of 30 µm electrolytic copper foil (collector) in a film form using a doctor blade method. NMP in the slurry was volatilized and removed to form a negative electrode active material layer on the electrolytic copper foil. Subsequently, the electrolytic copper foil and the negative electrode active material layer were adhered firmly and joined by compressing the electrolytic copper foil and the negative electrode active material layer such that the thickness of the negative electrode active material layer was 20 µm with a roll press machine.

Thereafter, heating treatment was conducted in vacuum (under reduced pressure) at 160° C. for 3 hours to the negative electrode active material layer in a dried state after NMP was removed, so that the intermediate composition contained in the negative electrode active material layer was subjected to condensation reaction and the negative electrode active material layer was heated and cured. Thereby, electrode sheets each containing as a binder for a negative electrode a polymer compound having a crosslinked structure were obtained.

Electrode sheets using each of PAA and PAI (polymer compound having amide bond moiety and imide bond moiety in molecular structure) as a binder for a negative electrode were produced in the same manner for comparison. Furthermore, electrode sheets were produced in the same manner using the intermediate composition of each of Reference Examples 1 to 3.

Production of Lithium Ion Rechargeable Battery

A separator was disposed between a negative electrode (electrode for evaluation) obtained by cutting each electrode sheet into a circle having a diameter of 11 mm and a positive electrode obtained by cutting metallic lithium foil having a thickness of 500 µm into a circle having a diameter of 13 mm to obtain an electrode body battery. In a battery case, the electrode body battery was accommodated and a nonaqueous electrolyte was injected, and the battery case was sealed to obtain a lithium ion rechargeable battery. As the separator, a glass filter manufactured by Hoechst Celanese Corporation and Celgard 2400 manufactured by Celgard, LLC. were used. As the nonaqueous electrolyte, a nonaqueous electrolyte obtained by dissolving lithium hexafluorophosphate in a mixed solvent in which ethylene carbonate and diethyl carbonate were mixed in a volume ratio of 1:1 such that the concentration of the lithium hexafluorophosphate was 1 M was used.

Evaluation of Battery Properties

The obtained lithium ion batteries were discharged at a direct current of 0.2 mA until the voltage at the negative electrode relative to the positive electrode reached 0.01 V, and charged at a direct current of 0.2 mA 10 minutes after the discharge was completed until the voltage at the negative electrode relative to the positive electrode reached 1.0 V. The discharge capacity in this cycle was defined as the initial discharge capacity, and the charge capacity in this cycle was defined as the initial charge capacity. The initial efficiency was calculated based on the following expression. The results are shown in Table 1.

Initial efficiency(%)=(Initial charge capacity/initial discharge capacity)×100

The above-described discharge and charge was counted as 1 cycle, and the specified cycles of charge and discharge were conducted to calculate the cyclability based on the following expression. The results are shown in Table 1.

Cyclability(%)=(Charge capacity after specified cycles/initial charge capacity)×100

TABLE 1

| Test Example | 1 | 2 | 3 | 4 | 5 | 6 | 7 |
|---|---|---|---|---|---|---|---|
| Binder for negative electrode | Example 1 | Example 2 | PAI | PAA | Reference Example 1 | Reference Example 2 | Reference Example 3 |
| Initial discharge capacity (mAh/g) | 1800 | 1681 | 1532 | 1289 | 1533 | 1492 | 1473 |

TABLE 1-continued

| Test Example | 1 | 2 | 3 | 4 | 5 | 6 | 7 |
|---|---|---|---|---|---|---|---|
| Initial charge capacity (mAh/g) | 1287 | 1179 | 1055 | 964 | 1034 | 1029 | 999 |
| Initial efficiency (%) | 71.5 | 70.3 | 68.9 | 74.8 | 67.4 | 70.0 | 67.8 |
| Cyclability (%) 20 cycles | 96.6 | 95.2 | 92.2 | 39.9 | 62.6 | 49.8 | 94.3 |

As shown in Table 1, the results were obtained in which both the initial efficiency and the cyclability showed a high value in Test Examples 1 and 2 utilizing Examples 1 and 2 respectively as a binder for a negative electrode. In contrast, the results were obtained in which one of or both the initial efficiency and the cyclability showed a low value in Test Examples 3 and 4 using PAI and PAA respectively as a binder for a negative electrode and in Test Examples 5 to 7 utilizing Reference Examples 1 to 3 respectively. Particularly in Test Example 7, the initial discharge capacity, the initial charge capacity, and the initial efficiency showed a low value although a multifunctional amine, which is in common with the multifunctional amines in Examples in that the multifunctional amine has an aromatic ring, was used as a constituent of the binder for a negative electrode. The factor for the results is considered as follows. That is, a link site corresponding to the Y moiety in the formula (1) does not exist in the binder for a negative electrode of Reference Example 3, and therefore the binder for a negative electrode does not follow the change in volume accompanying the intercalation and deintercalation of lithium.

From these results, it was ascertained that the polymer compounds obtained by condensing polyacrylic acid and a multifunctional amine having a specific molecular structure were useful as a binder for a negative electrode of an electrical storage device such as a rechargeable battery.

<Test 2>

Next, changes in the battery properties were evaluated for the intermediate composition of Example 1 in the case where the carboxy groups/amino groups ratio was made different by making the compounding ratio of PAA and the multifunctional amine different.

Examples 1-1 to 1-4:
PAA+4,4'-Diaminodiphenylmethane

Intermediate compositions of Examples 1-1 to 1-4 each having a different carboxy groups/amino groups ratio were obtained by making the amount of 4,4'-diaminodiphenylmethane blended different for the intermediate composition of Example 1. The carboxy groups/amino groups ratio of each Example is as shown in Table 2. The intermediate composition of Example 1-1 is the same as that in Example 1, and the carboxy groups/amino groups ratio was 9.5/1. The intermediate compositions of Examples 1-2 to 1-4 were prepared in the same manner as in Example 1 except that the amount of 4,4'-diaminodiphenylmethane blended was different.

Evaluation of Battery Properties

Electrode sheets using a polymer compound obtained from an intermediate composition as a binder for a negative electrode were produced using intermediate compositions of Examples 1-1 to 1-4. Lithium ion rechargeable batteries were produced using the obtained electrode sheets, and the battery properties of the lithium ion rechargeable batteries were evaluated. The results are shown in Table 2. The method of producing an electrode sheet and a lithium ion rechargeable battery and the method of evaluating the battery properties of a lithium ion rechargeable battery are the same as the above-described method.

TABLE 2

| | Test Example | | | |
|---|---|---|---|---|
| | 8 | 9 | 10 | 11 |
| | Binder for negative electrode | | | |
| | Example 1-1 | Example 1-2 | Example 1-3 | Example 1-4 |
| Carboxy groups/ amino groups ratio | 9.5/1 | 2/1 | 1/1 | 1/2 |
| Initial discharge capacity (mAh/g) | 1800 | 1494 | 1732 | 1579 |
| Initial charge capacity (mAh/g) | 1287 | 1062 | 1227 | 1121 |
| Initial efficiency (%) | 71.5 | 71.1 | 70.8 | 71.0 |
| Cyclability (%) 20 cycles | 96.6 | 95.6 | 93.3 | 86.1 |

As shown in Table 2, it was ascertained that there was a tendency that the cyclability of the rechargeable batteries was improved as the ratio of the carboxy groups to the amino groups became large.

<Test 3>

Next, changes in the battery properties were evaluated for the intermediate composition of Example 1 in the case where the condition of preheating treatment in preparing the intermediate composition was made different.

Example 1-1A: PAA+4,4'-Diaminodiphenylmethane

PAA having a weight average molecular weight of 800,000 was dissolved in NMP to prepare a 10% by mass PAA/NMP solution, and 7 ml (9.5 mmol in terms of monomer for PAA) of the PAA/NMP solution was taken out and placed in a flask under a nitrogen atmosphere. Separately from the solution, 0.1 g (0.5 mmol) of 4,4'-diaminodiphenylmethane was dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 80° C. for 3 hours with a Dean-Stark apparatus to obtain an intermediate composition of Example 1-1A in a state of an NMP solution.

Example 1-1B: PAA+4,4'-Diaminodiphenylmethane

PAA having a weight average molecular weight of 800,000 was dissolved in NMP to prepare a 10% by mass PAA/NMP solution, and 7 ml (9.5 mmol in terms of monomer for PAA) of the PAA/NMP solution was taken out and placed in a flask under a nitrogen atmosphere. Separately from the solution, 0.1 g (0.5 mmol) of 4,4'-diaminodiphenylmethane was dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature (25° C.) for 3 hours to obtain an intermediate composition of Example 1-1B in a state of an NMP solution.

Evaluation of Batteries

Electrode sheets using a polymer compound obtained from an intermediate composition as a negative electrode binder were produced using intermediate compositions obtained in Examples 1-1A to 1-1B. Lithium ion rechargeable batteries were produced using the obtained electrode sheets, and the battery properties of the lithium ion rechargeable batteries were evaluated. The results are shown in Table 2. The method of producing an electrode sheet and a lithium ion rechargeable battery and the method of evaluating the battery properties of a lithium ion rechargeable battery are the same as the above-described method.

TABLE 3

|  | Test Example | | |
|---|---|---|---|
|  | 8 | 12 | 13 |
|  | Binder for negative electrode | | |
|  | Example 1-1 | Example 1-1A | Example 1-1B |
| Preheating treatment | 130° C. | 80° C. | — |
| Initial discharge capacity (mAh/g) | 1800 | 1735 | 1806 |
| Initial charge capacity (mAh/g) | 1287 | 1239 | 1297 |
| Initial efficiency (%) | 71.5 | 71.4 | 71.8 |
| Cyclability (%) 20 cycles | 96.6 | 95.9 | 84.2 |

As shown in Table 3, the results were also obtained in which both the initial efficiency and the cyclability showed a high value in Test Example 13 where preheating treatment was not conducted in preparing the intermediate composition. From the comparison of Test Example 13 with Test Examples 8 and 12, it was ascertained that the cyclability of a rechargeable battery was further improved by conducting preheating treatment in preparing an intermediate composition and by increasing the temperature during preheating treatment.

<Test 4>

Next, changes in the battery properties were evaluated in the case where the condition of heating treatment of the negative electrode active material layer in producing an electrode sheet was made different.

Production of Electrode Sheets

A slurry was prepared by mixing 85 parts by mass of SiO, 5 parts by mass of acetylene black, and 10 parts by mass of the NMP solution of the intermediate composition of Example 1-2 and adding NMP to the resultant mixture. The slurry was applied to the surface of 30 μm electrolytic copper foil as a collector in a film form using a doctor blade method. NMP in the slurry was volatilized and removed to form a negative electrode active material layer on the electrolytic copper foil. Subsequently, the electrolytic copper foil and the negative electrode active material layer were adhered firmly and joined by compressing the electrolytic copper foil and the negative electrode active material layer such that the thickness of the negative electrode active material layer was 20 μm with a roll press machine.

Thereafter, heating treatment was conducted in vacuum (under reduced pressure) in such a way that the temperature and the time were made different as shown in Table 4 to the negative electrode active material layer in a dried state after NMP was removed, so that the intermediate composition contained in the negative electrode active material layer was subjected to condensation reaction and the negative electrode active material layer was heated and cured. Thereby, electrode sheets each containing as a binder for a negative electrode a polymer compound having a crosslinked structure were obtained.

Evaluation of Battery Properties

Lithium ion rechargeable batteries were produced using the obtained electrode sheets, and the battery properties of the lithium ion rechargeable batteries were evaluated. The results are shown in Table 4. The method of producing a lithium ion rechargeable battery and the method of evaluating the battery properties of a lithium ion rechargeable battery are the same as the above-described method.

TABLE 4

|  | Test Example | | | | |
|---|---|---|---|---|---|
|  | 14 | 9 | 15 | 16 | 17 |
|  | Binder for negative electrode | | | | |
|  | Example 1-2 | Example 1-2 | Example 1-2 | Example 1-2 | Example 1-2 |
| Heating treatment | 130° C. 3 hours | 160° C. 3 hours | 180° C. 2 hours | 200° C. 3 hours | 260° C. 3 hours |
| Initial discharge capacity (mAh/g) | 1701 | 1494 | 1763 | 1726 | 1769 |
| Initial charge capacity (mAh/g) | 1212 | 1062 | 1263 | 1232 | 1261 |
| Initial efficiency (%) | 71.3 | 71.1 | 71.6 | 71.4 | 71.3 |
| Cyclability (%) 20 cycles | 77.3 | 95.6 | 98.8 | 96.9 | 90.4 |

As shown in Table 4, the cyclability of the rechargeable batteries in Test Examples 15 and 16 where heating treatment was conducted at 180° C. and 200° C. respectively was improved when compared with that in Test Example 9 where heating treatment was conducted at 160° C.

In contrast, the cyclability of the rechargeable battery in Test Example 17 where heating treatment was conducted at 260° C. was lowered when compared with that in Test Example 9 where heating treatment was conducted at 160° C. As the cause for the result, it is considered that the temperature during heating treatment was excessively high, so that decomposition occurred to the polymer compound having a crosslinked structure formed through condensation reaction. The cyclability of the rechargeable battery in Test Example 14 where heating treatment was conducted at 130° C. was also lowered when compared with that in Test Example 9 where heating treatment was conducted at 160° C. As the cause for the result, it is considered that the temperature during heating treatment was excessively low, so that the polymer compound having a crosslinked structure was formed insufficiently.

From these results, it is considered that the formation of the polymer compound having a crosslinked structure, which is obtained through condensation reaction caused by heating treatment, contributes greatly to an improvement in the cyclability of a rechargeable battery. It is considered that the temperature during heating treatment is preferably in a range of 150 to 230° C.

<Test 5>

Next, the battery properties were evaluated in the case where a silicon material made of a layered polysilane was used as a negative electrode active material. In the present test, the polymer compound obtained from the intermediate composition of Example 1 was used as a binder for a negative electrode.

Preparation of Silicon Material

To 20 ml of concentrated hydrochloric acid cooled in an ice bath at 0° C. and containing hydrogen fluoride with a concentration of 1% by mass, 5 g of $CaSi_2$ were added and stirred for 1 hour, thereafter water was added thereto, and the resultant mixture was further stirred for 5 minutes. A yellow powder obtained by filtering the reaction solution was washed with water and ethanol and dried under a reduced pressure to obtain a layered polysilane. The obtained layered polysilane was heated to 500° C. under an argon atmosphere to obtain a silicon material in which hydrogen was eliminated from the polysilane.

Production of Electrode Sheets

A slurry was prepared by mixing 70 parts by mass of the silicon material, 15 parts by mass of natural graphite, 5 parts by mass of acetylene black, and 10 parts by mass of the NMP solution of the intermediate composition of Example 1 and adding NMP to the resultant mixture. The slurry was applied to the surface of 30 μm electrolytic copper foil as a collector in a film form using a doctor blade method. NMP in the slurry was volatilized and removed to form a negative electrode active material layer on the electrolytic copper foil. Subsequently, the electrolytic copper foil and the negative electrode active material layer were adhered firmly and joined by compressing the electrolytic copper foil and the negative electrode active material layer such that the thickness of the negative electrode active material layer was 20 μm with a roll press machine.

Thereafter, heating treatment was conducted in vacuum (under reduced pressure) at 180° C. for 2 hours to the negative electrode active material layer in a dried state after NMP was removed, so that the intermediate composition contained in the negative electrode active material layer was subjected to condensation reaction and the negative electrode active material layer was heated and cured. Thereby, an electrode sheet containing as a binder for a negative electrode a polymer compound having a crosslinked structure was obtained. Similar electrode sheets were produced using PAI and PAA in place of the NMP solution of the Example.

Evaluation of Battery Properties

Lithium ion rechargeable batteries were produced using the obtained electrode sheets, and the battery properties of the lithium ion rechargeable batteries were evaluated. The results are shown in Table 5. The method of producing a lithium ion rechargeable battery and the method of evaluating the battery properties of a lithium ion rechargeable battery are the same as the above-described method.

TABLE 5

| | Test Example | | |
|---|---|---|---|
| | 18 | 19 | 20 |
| | Binder for negative electrode | | |
| | Example 1 | PAI | PAA |
| Initial discharge capacity (mAh/g) | 1602 | 1650 | 1617 |
| Initial charge capacity (mAh/g) | 1274 | 1244 | 1281 |
| Initial efficiency (%) | 79.5 | 75.4 | 79.2 |
| Cyclability (%) 30 cycles | 91.1 | 84.3 | 56.1 |

As shown in Table 5, the results were obtained in which both the initial efficiency and the cyclability showed a high value in Test Example 18 utilizing Example 1 as a binder for a negative electrode. In contrast, the results were obtained in which one of or both the initial efficiency and the cyclability showed a low value in Test Examples 19 and 20 using PAI and PAA respectively as a binder for a negative electrode. From these results, it was ascertained that the polymer compound obtained by condensing polyacrylic acid and a multifunctional amine having a specific molecular structure is also useful as a binder for a negative electrode of an electrical storage device such as a rechargeable battery in the case where a silicon material made of a layered polysilane is used as a negative electrode active material.

<Test 6>

Next, the battery properties were evaluated in the case where a polymer compound obtained by condensing PAA and a trifunctional amine was used as a binder for a negative electrode.

Example 3:
PAA+1,3,5-Tris(4-Aminophenyl)Benzene

PAA having a weight average molecular weight of 800,000 was dissolved in NMP to prepare a 10% by mass PAA/NMP solution, and 2.33 ml (3.0 mmol in terms of monomer for PAA) of the PAA/NMP solution was taken out and placed in a flask under a nitrogen atmosphere. Separately from the solution, 0.105 g (0.3 mmol) of 1,3,5-tris(4-aminophenyl)benzene was dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted 130° C. for 3 hours with a Dean-Stark apparatus to obtain an intermediate composition of Example 3 in a state of an NMP solution.

Evaluation of Batteries

An electrode sheet using the silicon material as an active material was produced using the intermediate composition of Example 3 as a binder for a negative electrode in the same manner as described above. A lithium ion rechargeable battery was produced using the obtained electrode sheet, and the battery properties of the lithium ion rechargeable battery were evaluated. The results are shown in Table 6. The method of producing an electrode sheet is the same as the method in <Test 5>. The method of producing a lithium ion rechargeable battery and the method of evaluating the battery properties of a lithium ion rechargeable battery are the same as the above-described method.

TABLE 6

|  | Test Example | |
| --- | --- | --- |
|  | 21 | 18 |
|  | Binder for negative electrode | |
|  | Example 3 | Example 1 |
| Initial discharge capacity (mAh/g) | 1596 | 1602 |
| Initial charge capacity (mAh/g) | 1264 | 1274 |
| Initial efficiency (%) | 79.2 | 79.5 |
| Cyclability (%) 30 cycles | 90.1 | 91.1 |

As shown in Table 6, it was ascertained that the initial efficiency and cyclability in Test Example 21 using the polymer compound of Example 3 as a binder for a negative electrode were about the same as the initial efficiency and cyclability in Test Example 18 utilizing Example 1 as a binder for a negative electrode. From these results, it was ascertained that the polymer compound obtained by condensing PAA and a trifunctional amine was also useful as a binder for a negative electrode of an electrical storage device such as a rechargeable battery.

<Test 7>

Next, the battery properties were evaluated in the case where natural graphite was used as a negative electrode active material. In the present test, the polymer compound obtained from the intermediate composition of Example 1 was used as a binder for a negative electrode.

Production of Electrode Sheets

A slurry was prepared by mixing 95 parts by mass of natural graphite (particle diameter of 15 µm) and 5 parts by mass of the NMP solution of the intermediate composition of Example 1 and adding NMP to the resultant mixture. The slurry was applied to the surface of 30 µm electrolytic copper foil as a collector in a film form using a doctor blade method. NMP in the slurry was volatilized and removed to form a negative electrode active material layer on the electrolytic copper foil. Subsequently, the electrolytic copper foil and the negative electrode active material layer were adhered firmly and joined by compressing the electrolytic copper foil and the negative electrode active material layer such that the thickness of the negative electrode active material layer was 20 µm with a roll press machine.

Thereafter, heating treatment was conducted in vacuum (under reduced pressure) at 180° C. for 2 hours to the negative electrode active material layer in a dried state after NMP was removed, so that the intermediate composition contained in the negative electrode active material layer was subjected to condensation reaction and the negative electrode active material layer was heated and cured. Thereby, an electrode sheet containing as a binder for a negative electrode a polymer compound having a crosslinked structure was obtained. Similar electrode sheets were produced using an aqueous solution of PAA and an NMP solution of PAA in place of the NMP solution in the Example.

Evaluation of Battery Properties

Lithium ion rechargeable batteries were produced using the obtained electrode sheets, and the battery properties of the lithium ion rechargeable batteries were evaluated. The results are shown in Table 7. The method of producing a lithium ion rechargeable battery and the method of evaluating the battery properties of a lithium ion rechargeable battery are the same as the above-described method.

TABLE 7

|  | Test Example | | |
| --- | --- | --- | --- |
|  | 22 | 23 | 24 |
|  | Binder for negative electrode | | |
|  | Example 1 | PAA-NMP | PAA-H$_2$O |
| Initial discharge capacity (mAh/g) | 364 | 387 | 383 |
| Initial charge capacity (mAh/g) | 346 | 350 | 341 |
| Initial efficiency (%) | 95.1 | 90.4 | 89.0 |

As shown in Table 7, the results were obtained in which the initial efficiency showed a higher value in Test Example 22 utilizing Example 1 as a binder for a negative electrode than in Test Examples 23 and 24 using PAA. From these results, it was ascertained that the polymer compound obtained by condensing polyacrylic acid and a multifunctional amine having a specific molecular structure was also useful as a binder for a negative electrode of an electrical storage device such as a rechargeable battery in the case where the natural graphite was used as a negative electrode active material.

It is known that the volume of the negative electrode in which natural graphite is used as a negative electrode active material changes accompanying the intercalation and deintercalation of lithium. Therefore, it is considered that the effect of improving the battery properties by the polymer compound obtained by condensing polyacrylic acid and a multifunctional amine having a specific molecular structure is based on the stability against the change in volume accompanying the intercalation and deintercalation of lithium.

<Test 8>

Next, the battery properties were evaluated in the case where polymer compounds obtained by condensing PAA and an additional multifunctional amine having a structure satisfying the formula (1) were used as a binder for a negative electrode.

Example 4: PAA+3,3'-Diaminodiphenylmethane

PAA having a weight average molecular weight of 800,000 was dissolved in NMP to prepare a 10% by mass PAA/NMP solution, and 7 ml (9.5 mmol in terms of monomer for PAA) of the PAA/NMP solution was taken out and placed in a flask under a nitrogen atmosphere. Separately from the solution, 0.475 g (2.375 mmol) of 3,3'-diaminodiphenylmethane was dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 4 in a state of an NMP solution.

Example 5: PAA+3,4'-Diaminodiphenylmethane

PAA having a weight average molecular weight of 800,000 was dissolved in NMP to prepare a 10% by mass PAA/NMP solution, and 7 ml (9.5 mmol in terms of monomer for PAA) of the PAA/NMP solution was taken out and placed in a flask under a nitrogen atmosphere. Separately from the solution, 0.475 g (2.375 mmol) of 3,4'-diaminodiphenylmethane was dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 5 in a state of an NMP solution.

Example 6: PAA+4,4'-Ethylenedianiline

PAA having a weight average molecular weight of 800,000 was dissolved in NMP to prepare a 10% by mass PAA/NMP solution, and 7 ml (9.5 mmol in terms of monomer for PAA) of the PAA/NMP solution was taken out and placed in a flask under a nitrogen atmosphere. Separately from the solution, 0.51 g (2.375 mmol) of 4,4'-ethylenedianiline was dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 6 in a state of an NMP solution.

Example 7: PAA+4,4'-Diamino-3,3'-didimethyldiphenylmethane

PAA having a weight average molecular weight of 800,000 was dissolved in NMP to prepare a 10% by mass PAA/NMP solution, and 7 ml (9.5 mmol in terms of monomer for PAA) of the PAA/NMP solution was taken out and placed in a flask under a nitrogen atmosphere. Separately from the solution, 0.54 g (2.375 mmol) of 4,4'-diamino-3,3'-didimethyldiphenylmethane was dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 7 in a state of an NMP solution.

Example 8: PAA+2,2'-Bis(4-Aminophenyl)Hexafluoropropane

PAA having a weight average molecular weight of 800,000 was dissolved in NMP to prepare a 10% by mass PAA/NMP solution, and 7 ml (9.5 mmol in terms of monomer for PAA) of the PAA/NMP solution was taken out and placed in a flask under a nitrogen atmosphere. Separately from the solution, 0.8 g (2.375 mmol) of 2,2'-bis(4-aminophenyl)hexafluoropropane was dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 8 in a state of an NMP solution.

Production of Electrode Sheets

Slurries were each prepared by mixing 85 parts by mass of SiO, 5 parts by mass of acetylene black, and 10 parts by mass of the NMP solution of the intermediate composition of each of Examples 4 to 8 and adding NMP to the resultant mixture. Each slurry was applied to the surface of 30 μm electrolytic copper foil (collector) in a film form using a doctor blade method. NMP in the slurry was volatilized and removed to form a negative electrode active material layer on the electrolytic copper foil. Subsequently, the electrolytic copper foil and the negative electrode active material layer were adhered firmly and joined by compressing the electrolytic copper foil and the negative electrode active material layer such that the thickness of the negative electrode active material layer was 20 μm with a roll press machine.

Thereafter, heating treatment was conducted in vacuum (under reduced pressure) at 180° C. for 3 hours to the negative electrode active material layer in a dried state after NMP was removed, so that the intermediate composition contained in the negative electrode active material layer was subjected to condensation reaction and the negative electrode active material layer was heated and cured. Thereby, electrode sheets each containing as a binder for a negative electrode a polymer compound having a crosslinked structure were obtained.

Evaluation of Battery Properties

Lithium ion rechargeable batteries were produced using the obtained electrode sheets, and the battery properties of the lithium ion rechargeable batteries were evaluated. The results are shown in Table 8. In addition, the method of producing a lithium ion rechargeable battery and the method of evaluating the battery properties of a lithium ion rechargeable battery are the same as the above-described method.

TABLE 8

| | Test Example | | | | |
|---|---|---|---|---|---|
| | 25 | 26 | 27 | 28 | 29 |
| | Binder for negative electrode | | | | |
| | Example 4 | Example 5 | Example 6 | Example 7 | Example 8 |
| Initial discharge capacity (mAh/g) | 1540 | 1576 | 1586 | 1554 | 1730 |
| Initial charge capacity (mAh/g) | 1094 | 1110 | 1130 | 1103 | 1244 |
| Initial efficiency (%) | 71 | 70.4 | 71.3 | 71 | 71.9 |
| Cyclability (%) 20 cycles | 95.1 | 95.5 | 96.2 | 95.3 | 94.9 |

As shown in Table 8, the results were obtained in which both the initial efficiency and the cyclability showed a high value in Test Examples 25 to 29 utilizing Examples 4 to 8 respectively as a binder for a negative electrode. From these results, it was ascertained that a polymer compound useful as a binder for a negative electrode was obtained from a multifunctional amine as long as the multifunctional amine had a structure satisfying the formula (1) even in the case where the positions of amino groups were different, where an additional functional group existed or did not exist, or where the structure of the Y moiety was different.

<Test 9>

Next, changes in the molecular structure in the process of heating and curing an intermediate composition was analyzed for the binder for a negative electrode obtained from the intermediate composition (PAA+4,4'-diaminodiphenylmethane) of Example 1 by thermal scanning infrared spectroscopic measurement.

First, calcium fluoride pulverized in a mortar was shaped into a disk-like substrate having a diameter of 10 mm. Next, about 10 μl of the NMP solution of the intermediate composition of Example 1 was dropped onto one face of the substrate under an argon atmosphere, and the substrate was left to stand for 24 hours to be dried, and was then left to stand in vacuum (under reduced pressure) for 1 hour to be further dried. Thereby, a sample for measurement with an intermediate composition layer having a thickness of about 5 μm was prepared on one side of the calcium fluoride substrate. Preparation of the sample for measurement was all conducted at room temperature. Thermal scanning infrared spectroscopic measurement (transmission method) was conducted for the sample for measurement to measure the increase/decrease change of peaks each indicating a molecular structure with time. The measurement condition is as follows. Measurement results are shown in Table 9.

Measurement apparatus: Fourier transform infrared spectrophotometer Carry 670 (manufactured by Agilent Technologies Inc.)

Measurement temperature: The temperature was raised from 30° C. to each measurement temperature at a rate of temperature increase of 5° C./min, and thereafter a state at 200° C. was held for 2 hours.

TABLE 9

| Structure | CO—O—CO | CONH | COOH | NH$_2$ |
|---|---|---|---|---|
| Peak range (cm$^{-1}$) | 1800 | 1595 | 2600 | 1630 |
| 30° C. (before heating) | Not detected | Not detected | Detected | Detected |
| 30° C.-125° C. | Not detected | Detected | Decreased | Decreased |
| 125° C.-150° C. | Not detected | Increased | Decreased | Decreased |
| 150° C.-180° C. | Not detected | Increased | Decreased | Not detected |
| 180° C.-200° C. | Detected | Increased | Decreased | Not detected |
| Held at 200° C. | Increased | Increased | Decreased | Not detected |

As shown in Table 9, the peak indicating an amide bond (CONH) began to be detected somewhere from 30° C. to 125° C., and thereafter the intensity thereof gradually increased as the heating temperature increased. In contrast, the intensities of the peak indicating a carboxy group (COOH) and the peak indicating an amine (NH$_2$) gradually decreased as the heating temperature increased. Particularly, the peak indicating the amine disappeared somewhere from 150° C. to 180° C. From these results, it is understood that the carboxy group and the amine are consumed and the amide bonds are formed as the heating temperature increases.

The peak indicating an acid anhydride structure (CO—O—CO) was newly detected in a range of 180° C. to 200° C. It is considered that the acid anhydride structure is a carboxylic acid anhydride formed when the heating temperature reaches 180° C. or higher through dehydration condensation of carboxy groups not involving the formation of a crosslinked structure (amide bond). An effect of improving the cyclability by increasing the heating temperature is shown in <Test 4>, and the formation of the acid anhydride structure is considered as one of factors for obtaining the effect of improving the cyclability.

<Test 10>

Next, changes in the battery properties were evaluated in the case where a dehydration condensation catalyst was used and the heating time was made different in the heating treatment of a negative electrode active material layer in producing an electrode sheet.

Production of Electrode Sheets

A slurry was prepared by mixing 70 parts by mass of the silicon material, 15 parts by mass of natural graphite, 5 parts by mass of acetylene black, and 10 parts by mass of the NMP solution of the intermediate composition of Example 1-2 and adding NMP to the resultant mixture. As a dehydration condensation catalyst, 5 parts by mass of 1-methylimidazole was added to the whole amount of the slurry. The silicon material is a silicon material made of a layered polysilane, which was used in Test 5. The slurry was applied to the surface of 30 μm electrolytic copper foil as a collector in a film form using a doctor blade method. NMP in the slurry was volatilized and removed to form a negative electrode active material layer on the electrolytic copper foil. Subsequently, the electrolytic copper foil and the negative electrode active material layer were adhered firmly and joined by compressing the electrolytic copper foil and the negative electrode active material layer such that the thickness of the negative electrode active material layer was 20 μm with a roll press machine.

Thereafter, heating treatment was conducted in vacuum for 2 hours (under reduced pressure) in such a way that the temperature was made different as shown in Table 10 to the negative electrode active material layer in a dried state after NMP was removed, so that the intermediate composition contained in the negative electrode active material layer was subjected to condensation reaction and the negative electrode active material layer was heated and cured. Thereby, electrode sheets each containing as a binder for a negative electrode a polymer compound having a crosslinked structure was obtained. In addition, an electrode sheet was produced for comparison using a slurry not containing a dehydration condensation catalyst.

Evaluation of Battery Properties

Lithium ion rechargeable batteries were produced using the obtained electrode sheets, and the battery properties of the lithium ion rechargeable batteries were evaluated. The results are shown in Table 10. The method of producing a lithium ion rechargeable battery and the method of evaluating the battery properties of a lithium ion rechargeable battery are the same as the above-described method.

TABLE 10

| | Test Example | | | | |
|---|---|---|---|---|---|
| | 30 | 31 | 32 | 33 | 34 |
| | Binder for negative electrode | | | | |
| | Example 1-2 | Example 1-2 | Example 1-2 | Example 1-2 | Example 1-2 |
| Dehydration condensation catalyst | Present | Present | Present | Absent | Absent |
| Temperature of heating treatment | 180° C. | 160° C. | 140° C. | 200° C. | 160° C. |
| Initial discharge capacity (mAh/g) | 1607 | 1597 | 1615 | 1602 | 1621 |

TABLE 10-continued

| | Test Example | | | | |
|---|---|---|---|---|---|
| | 30 | 31 | 32 | 33 | 34 |
| | Binder for negative electrode | | | | |
| | Example 1-2 | Example 1-2 | Example 1-2 | Example 1-2 | Example 1-2 |
| Initial charge capacity (mAh/g) | 1273 | 1270 | 1252 | 1275 | 1266 |
| Initial efficiency (%) | 79.2 | 79.5 | 77.5 | 79.6 | 78.1 |
| Cyclability (%) 20 cycles | 91.8 | 93.5 | 77.4 | 91.0 | 63.9 |

As shown in Table 10, the initial efficiency and cyclability in Test Examples 30 and 32 where heating treatment was conducted in the presence of a dehydration condensation catalyst were the same as or higher than those in Test Examples 33 and 34 respectively, where heating treatment was conducted in the absence of a dehydration condensation catalyst, even though the temperature of heating treatment was lower in Test Examples 30 and 32 than in Test Examples 33 and 34 respectively. The cyclability was much more improved in Test Example 31 where heating treatment was conducted in the presence of a dehydration condensation catalyst than in Test Example 34 where heating treatment was conducted under the same condition in the absence of a dehydration condensation catalyst.

From these results, it was ascertained that the amidation reaction and imidation reaction during formation of a polymer compound were facilitated by conducting heating treatment in the presence of a dehydration condensation catalyst, so that the intended crosslinked structure was obtained at a lower temperature.

<Test 11>

Next, the battery properties were evaluated in the case where polymer compounds obtained by condensing PAA, a multifunctional amine having a structure satisfying the formula (1), and an additional multifunctional amine was used as a binder for a negative electrode.

Example 9: PAA+4,4'-Diaminodiphenylmethane+1,4-Diaminobutane

PAA having a weight average molecular weight of 800,000 was dissolved in NMP to prepare a 10% by mass PAA/NMP solution, and 7 ml (9.5 mmol in terms of monomer for PAA) of the PAA/NMP solution was taken out and placed in a flask under a nitrogen atmosphere. Separately from the solution, 0.47 g (2.375 mmol) of 4,4'-diaminodiphenylmethane and 0.02 g (0.227 mmol) of 1,4-diaminobutane were dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 9 in a state of an NMP solution.

Example 10: PAA+4,4'-Diaminodiphenylmethane+1,6-Diaminohexane

PAA having a weight average molecular weight of 800,000 was dissolved in NMP to prepare a 10% by mass PAA/NMP solution, and 7 ml (9.5 mmol in terms of monomer for PAA) of the PAA/NMP solution was taken out and placed in a flask under a nitrogen atmosphere. Separately from the solution, 0.47 g (2.375 mmol) of 4,4'-diaminodiphenylmethane and 0.02 g (0.172 mmol) of 1,6-diaminohexane were dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 10 in a state of an NMP solution.

Example 11: PAA+4,4'-Diaminodiphenylmethane+3-Aminoaniline

PAA having a weight average molecular weight of 800,000 was dissolved in NMP to prepare a 10% by mass PAA/NMP solution, and 7 ml (9.5 mmol in terms of monomer for PAA) of the PAA/NMP solution was taken out and placed in a flask under a nitrogen atmosphere. Separately from the solution, 0.47 g (2.375 mmol) of 4,4'-diaminodiphenylmethane and 0.02 g (0.185 mmol) of 3-aminoaniline were dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 11 in a state of an NMP solution.

Example 12: PAA+4,4'-Diaminodiphenylmethane+2,6-Diaminopyridine

PAA having a weight average molecular weight of 800,000 was dissolved in NMP to prepare a 10% by mass PAA/NMP solution, and 7 ml (9.5 mmol in terms of monomer for PAA) of the PAA/NMP solution was taken out and placed in a flask under a nitrogen atmosphere. Separately from the solution, 0.47 g (2.375 mmol) of 4,4'-diaminodiphenylmethane and 0.02 g (0.183 mmol) of 2,6-diaminopyridine were dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 12 in a state of an NMP solution.

Example 13: PAA+4,4'-Diaminodiphenylmethane+1,3-Diiminoisoindoline

PAA having a weight average molecular weight of 800,000 was dissolved in NMP to prepare a 10% by mass PAA/NMP solution, and 7 ml (9.5 mmol in terms of monomer for PAA) of the PAA/NMP solution was taken out and placed in a flask under a nitrogen atmosphere. Separately from the solution, 0.47 g (2.375 mmol) of 4,4'-diaminodiphenylmethane and 0.02 g (0.137 mmol) of 1,3-diiminoisoindoline were dissolved in 0.4 ml of NMP to prepare an amine/NMP solution. The whole amount of the amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 13 in a state of an NMP solution.

Production of Electrode Sheets

Slurries were each prepared by mixing 70 parts by mass of the silicon material, 15 parts by mass of natural graphite, 5 parts by mass of acetylene black, and 10 parts by mass of the NMP solution of the intermediate composition of each of Examples 9 to 13 and adding NMP to the resultant mixture. To the whole amount of the slurry, 5 parts by mass of 1-methylimidazole was added. The silicon material is a silicon material made of a layered polysilane, which was used in Test 5. Each slurry was applied to the surface of 30 μm electrolytic copper foil as a collector in a film form using a doctor blade method. NMP in the slurry was volatilized and removed to form a negative electrode active material layer on the electrolytic copper foil. Subsequently, the electrolytic copper foil and the negative electrode active material layer were adhered firmly and joined by compressing the electrolytic copper foil and the negative electrode active material layer such that the thickness of the negative electrode active material layer was 20 μm with a roll press machine.

Thereafter, heating treatment was conducted in vacuum (under reduced pressure) at 180° C. for 2 hours to the negative electrode active material layer in a dried state after NMP was removed, so that the intermediate composition contained in the negative electrode active material layer was subjected to condensation reaction and the negative electrode active material layer was heated and cured. Thereby, electrode sheets each containing as a binder for a negative electrode a polymer compound having a crosslinked structure were obtained.

Evaluation of Battery Properties

Lithium ion rechargeable batteries were produced using the obtained electrode sheets, and the battery properties of the lithium ion rechargeable batteries were evaluated. The results are shown in Table 11. The method of producing a lithium ion rechargeable battery and the method of evaluating the battery properties of a lithium ion rechargeable battery are the same as the above-described method.

As shown in Table 11, the initial efficiency and cyclability in Test Examples 35 to 39 utilizing as a binder for a negative electrode Examples 9 to 13 where the multifunctional amine having a structure satisfying the formula (1) and the additional multifunctional amine were condensed were the same as or higher than those in Test Example 30 utilizing Example 1-2 as a binder for a negative electrode. From these results, it was ascertained that the polymer compounds in which an additional multifunctional amine was condensed were also useful as a binder for a negative electrode of an electrical storage device such as a rechargeable battery.

<Test 12>

Next, changes in the battery properties caused when the compounding ratio of an additional multifunctional amine was made different were evaluated in the case where polymer compounds obtained by condensing PAA, a multifunctional amine having a structure satisfying the formula (1), and the additional multifunctional amine were used as a binder for a negative electrode.

Examples 11-1 to 11-3: PAA+4,4'-Diaminodiphenylmethane+3-Aminoaniline

Intermediate compositions of Examples 11-1 to 11-3 were obtained by making the amount of 3-aminoaniline (additional multifunctional amine) blended different for the intermediate composition of Example 11. The amount of 3-aminoaniline blended in each Example is as shown in the row of the additional multifunctional amine in Table 12. Preparation was conducted in Examples 11-1 to 11-3 in the same manner as in Example 11 except that the amount of 3-aminoaniline blended was different.

Evaluation of Batteries

Electrode sheets using a polymer compound obtained from an intermediate composition as a negative electrode binder were produced using intermediate compositions of Examples 11-1 to 11-3. The method of producing an electrode sheet is the same as the method in Test 11. Lithium ion rechargeable batteries were produced using the obtained electrode sheets, and the battery properties of the lithium ion rechargeable batteries were evaluated. The results are shown in Table 12. The method of producing a lithium ion rechargeable battery and the method of evaluating the battery properties of a lithium ion rechargeable battery are the same as the above-described method.

TABLE 11

| Test Example | 35 | 36 | 37 | 38 | 39 | 30 |
|---|---|---|---|---|---|---|
| Binder for negative electrode | Example 9 | Example 10 | Example 11 | Example 12 | Example 13 | Example 1-2 |
| Initial discharge capacity (mAh/g) | 1543 | 1485 | 1431 | 1508 | 1551 | 1607 |
| Initial charge capacity (mAh/g) | 1250 | 1197 | 1149 | 1208 | 1239 | 1273 |
| Initial efficiency (%) | 81.0 | 80.6 | 80.3 | 80.1 | 79.9 | 79.2 |
| Cyclability (%) 20 cycles | 92.8 | 91.7 | 92.1 | 90.9 | 92.4 | 91.8 |

TABLE 12

| | Test Example | | | |
|---|---|---|---|---|
| | 40 | 37 | 41 | 42 |
| | Binder for negative electrode | | | |
| | Example 11-1 | Example 11 | Example 11-2 | Example 11-3 |
| Additional multifunctional amine (g) | 0.01 | 0.02 | 0.04 | 0.1 |
| Initial discharge capacity (mAh/g) | 1496 | 1431 | 1505 | 1459 |
| Initial charge capacity (mAh/g) | 1211 | 1149 | 1201 | 1096 |
| Initial efficiency (%) | 80.9 | 80.3 | 79.8 | 75.1 |
| Cyclability (%) 20 cycles | 91.9 | 92.1 | 91.7 | 87.2 |

As shown in Table 12, it was ascertained that there was a tendency that the initial efficiency and the cyclability were lowered as the amount of the additional multifunctional amine blended increased. As the cause for the result, it is considered that when the crosslinked structures derived from the additional multifunctional amine increase too much in the polymer compound, the state of crosslink in the polymer compound greatly changes to lower the characteristics as a binder for a negative electrode. From these results, it is suggested that, in the case where a crosslinked structure derived from an additional multifunctional amine is added, control of the crosslinked structure to be a certain amount or less be preferable.

<Test 13>

Next, changes in the battery properties caused when the molecular weight of PAA was made different were evaluated in the case where a polymer compound obtained by condensing PAA and a multifunctional amine having a structure satisfying the formula (1) was used as a binder for a negative electrode.

Examples 1-5 to 1-7:
PAA+4,4'-Diaminodiphenylmethane

Intermediate compositions of Examples 1-5 to 1-7 were obtained using PAAs each having a different molecular weight (weight average molecular weight) for the intermediate composition of Example 1. The molecular weight of PAA in each Example is as shown in the row of the molecular weight of PAA in Table 13. Preparation was conducted in Examples 1-5 to 1-7 in the same manner as in Example 1 except that the molecular weight of PAA was different. Polyacrylic acid manufactured by Wako Pure Chemical Industries, Ltd. was used in each Example.

Evaluation of Batteries

Electrode sheets using a polymer compound obtained from an intermediate composition as a negative electrode binder were produced using intermediate compositions of Examples 1-5 to 1-7. The method of producing an active material and an electrode sheet is the same as the method in Test 5. Lithium ion rechargeable batteries were produced using the obtained electrode sheets, and the battery properties of the lithium ion rechargeable batteries were evaluated. The results are shown in Table 13. The method of producing a lithium ion rechargeable battery and the method of evaluating the battery properties of a lithium ion rechargeable battery are the same as the above-described method.

TABLE 13

| | Test Example | | | |
|---|---|---|---|---|
| | 18 | 43 | 44 | 45 |
| | Binder for negative electrode | | | |
| | Example 1 | Example 1-5 | Example 1-6 | Example 1-7 |
| Molecular weight of PAA | 800,000 | 150,000 | 100,000 | 25,000 |
| Initial discharge capacity (mAh/g) | 1602 | 1520 | 1599 | 1586 |
| Initial charge capacity (mAh/g) | 1274 | 1204 | 1273 | 1263 |
| Initial efficiency (%) | 79.5 | 79.2 | 79.6 | 79.6 |
| Cyclability (%) 20 cycles | 91.1 | 91.0 | 91.7 | 91.3 |

As shown in Table 13, a significant difference in the battery properties was not observed even in the case where the molecular weight of PAA was made different. From these results, it is suggested that, in the exhibition of the function of a polymer compound obtained from the intermediate composition of Example as a binder for a negative electrode, the crosslinked structure (for example, amine structure at a crosslink site, and amide structure and imide structure at a crosslink point) of the polymer compound be important and the length of the chain structure constituted by PAA not give a substantial influence.

When preparation of an intermediate composition was attempted using PAA having a molecular weight of 9,000, separation of solids was observed in a solution. From this result, it is suggested that the use of PAA having a certain molecular weight or higher be preferable from the viewpoint of easiness of preparation of an intermediate composition.

<Test 14>

Next, changes in the characteristics of slurries and changes in the battery properties were evaluated in the case where the molecular weight of a polymer compound as a binder for a negative electrode was made different.

Example 14: PAA+4,4'-Diaminodiphenylmethane

PAA having a weight average molecular weight of 800,000 was dissolved in NMP to prepare a PAA/NMP solution having a solid concentration of PAA of 7% by mass, and 6 g (5.83 mmol in terms of monomer for PAA) of the PAA/NMP solution was taken out and placed in a flask under a nitrogen atmosphere. Separately from the solution, 4,4'-diaminodiphenylmethane was dissolved in NMP to prepare a 50% by mass amine/NMP solution. Into the PAA/NMP solution, 0.577 g (1.47 mmol) of the amine/NMP solution was dropped while stirring the PAA/NMP solution in the flask, and stirring was continued at room temperature for 30 minutes. Thereafter, heating treatment (preheating treatment) was conducted at 110° C. for 3 hours with a Dean-Stark apparatus to obtain an intermediate composition of Example 14 in a state of an NMP solution (solid content ratio of 10.8% by mass and viscosity of 3,000 cP).

Example 15: PAA+4,4'-Diaminodiphenylmethane

PAA having a weight average molecular weight of 250,000 was dissolved in NMP to prepare a PAA/NMP solution having a solid concentration of PAA of 15% by mass, and 6 g (12.5 mmol in terms of monomer for PAA) of the PAA/NMP solution was taken out and placed in a flask under a nitrogen atmosphere. Separately from the solution, 4,4'-diaminodiphenylmethane was dissolved in NMP to prepare a 50% by mass amine/NMP solution. Into the PAA/NMP solution, 1.236 g (3.13 mmol) of the amine/NMP solution was dropped while stirring the PAA/NMP solution in the flask, and stirring was continued at room temperature for 30 minutes. Thereafter, heating treatment (preheating treatment) was conducted at 110° C. for 3 hours with a Dean-Stark apparatus to obtain an intermediate composition of Example 15 in a state of an NMP solution (solid content ratio of 21% by mass and viscosity of 3,000 cP).

Example 16: PAA+4,4'-Diaminodiphenylmethane

Vacuum drying and solvent substitution by acetone were conducted to an aqueous solution of PAA having a weight average molecular weight of 100,000 to remove water until the water content reached 1% by mass or less. The PAA from which water was removed was dissolved in NMP to prepare a PAA/NMP solution having a solid concentration of PAA of 20% by mass, and 6 g (16.7 mmol in terms of monomer for PAA) of the PAA/NMP solution was taken out and placed in a flask under a nitrogen atmosphere. Separately from the solution, 4,4'-diaminodiphenylmethane was dissolved in NMP to prepare a 50% by mass amine/NMP solution. Into the PAA/NMP solution, 1.648 g (4.16 mmol) of the amine/NMP solution was dropped while stirring the PAA/NMP solution in the flask, and stirring was continued at room temperature for 30 minutes. Thereafter, heating treatment (preheating treatment) was conducted at 110° C. for 3 hours with a Dean-Stark apparatus to obtain an intermediate composition of Example 16 in a state of an NMP solution (solid content ratio of 26.5% by mass and viscosity of 3,000 cP).

Example 17: PAA+4,4'-Diaminodiphenylmethane

Vacuum drying and solvent substitution by acetone were conducted to an aqueous solution of PAA having a weight average molecular weight of 50,000 to remove water until the water content reached 1% by mass or less. The PAA from which water was removed was dissolved in NMP to prepare a PAA/NMP solution having a solid concentration of PAA of 24% by mass, and 6 g (20.0 mmol in terms of monomer for PAA) of the PAA/NMP solution was taken out and placed in a flask under a nitrogen atmosphere. Separately from the solution, 4,4'-diaminodiphenylmethane was dissolved in NMP to prepare a 50% by mass amine/NMP solution. Into the PAA/NMP solution, 1.978 g (5.0 mmol) of the amine/NMP solution was dropped while stirring the PAA/NMP solution in the flask, and stirring was continued at room temperature for 30 minutes. Thereafter, heating treatment (preheating treatment) was conducted at 110° C. for 3 hours with a Dean-Stark apparatus to obtain an intermediate composition of Example 17 in a state of an NMP solution (solid content ratio of 30.4% by mass and viscosity of 3,000 cP).

Example 18: PAA+4,4'-Diaminodiphenylmethane

PAA having a weight average molecular weight of 250,000 was dissolved in NMP to prepare a PAA/NMP solution having a solid concentration of PAA of 30% by mass, and 6 g (25.0 mmol in terms of monomer for PAA) of the PAA/NMP solution was taken out and placed in a flask under a nitrogen atmosphere. Separately from the solution, 4,4'-diaminodiphenylmethane was dissolved in NMP to prepare a 50% by mass amine/NMP solution. Into the PAA/NMP solution, 2.472 g (6.25 mmol) of the amine/NMP solution was dropped while stirring the PAA/NMP solution in the flask, and stirring was continued at room temperature for 30 minutes. Thereafter, heating treatment (preheating treatment) was conducted at 110° C. for 3 hours with a Dean-Stark apparatus to obtain an intermediate composition of Example 18 in a state of an NMP solution (solid content ratio of 35.8% by mass and viscosity of 3,000 cP).

Changes in the characteristics of slurries and changes in the battery properties were evaluated as Reference Examples in the case where the molecular weight of PAI as a binder for a negative electrode was made different.

Reference Example 4: PAI

In 17.5 g of NMP, 2.503 g (10 mmol) of 4,4'-methylenediphenyl diisocyanate was dissolved to prepare the first NMP solution. Separately from the solution, 1.92 g (10 mmol) of trimellitic anhydride chloride was dissolved in 13.4 g of NMP to prepare the second NMP solution. The second NMP solution was added to the first NMP solution under an inert gas atmosphere, and heating treatment was conducted at 90° C. for 5 hours to obtain an NMP solution (solid content ratio of 12.5% by mass and viscosity of 200 cP) of PAI having a molecular weight of 20,000.

Reference Example 5: PAI

In 11.4 g of NMP, 2.503 g (10 mmol) of 4,4'-methylenediphenyl diisocyanate was dissolved to prepare the first NMP solution. Separately from the solution, 1.92 g (10 mmol) of trimellitic anhydride chloride was dissolved in 8.75 g of NMP to prepare the second NMP solution. The second NMP solution was added to the first NMP solution under an inert gas atmosphere, and heating treatment was conducted at 80° C. for 3 hours to obtain an NMP solution (solid content ratio of 18% by mass and viscosity of 180 cP) of PAI having a molecular weight of 5,000.

Production of Electrode Sheets

Slurries were each prepared by mixing 85 parts by mass of the silicon material, 5 parts by mass of acetylene black, and the NMP solution corresponding to a solid content of 10% by mass of the intermediate composition of each of Examples 14 to 18 and Reference Examples 4 and 5 and adding NMP to the resultant mixture such that the viscosity reached 2500 cP. The total solid content ratio of each slurry is shown in Table 14. Each slurry was applied to the surface of 30 μm electrolytic copper foil as a collector in a film form using a doctor blade method. The electrolytic copper foil was left to stand on a hot plate at 80° C. for 15 minutes, so that NMP in the slurry was volatilized and removed to form a negative electrode active material layer on the electrolytic copper foil. Subsequently, the electrolytic copper foil and the negative electrode active material layer were adhered firmly and joined by compressing the electrolytic copper foil and the negative electrode active material layer such that the thickness of the negative electrode active material layer was 20 μm with a roll press machine. The electrode sheet was cut into a circle having a diameter of 11 mm to prepare an electrode body, and heating treatment was conducted in vacuum (under reduced pressure) at 180° C. for 2 hours, so that the negative electrode active material layer was heated and cured.

The mass of the electrode body was measured before and after the heat-curing treatment to determine the decrement during before and after the heat-curing treatment. The amount of the residual solvents contained in the negative electrode active material layer before the heat-curing treatment was calculated assuming that the decrease in mass after the heat-curing treatment was completely attributable to volatilization of the solvents.

Evaluation of Batteries

Lithium ion rechargeable batteries were produced using the obtained electrode sheets, and the battery properties of the lithium ion rechargeable batteries were evaluated. The results are shown in Table 14. The method of producing a lithium ion rechargeable battery and the method of evaluating the battery properties of a lithium ion rechargeable battery are the same as the above-described method.

active material layer before heat-curing treatment is lowered as the molecular weight of PAA is lowered. It is considered that the result is attributable to the fact that the molecular weight of the polymer compound is lowered as the molecular weight of PAA is lowered, so that the amount of a solvent necessary for the preparation of slurry is reduced and the total solid content ratio can be set large.

<Test 15>

Next, changes in the battery properties were evaluated for electrode sheets using a polymer compound according to the present embodiment as a binder for a negative electrode and also using the silicon material (refer to Test 5) as a negative electrode active material in the case where the compounding ratio of the negative electrode active material and the binder for a negative electrode was made different.

TABLE 14

| Test Example | 46 | 47 | 48 | 49 | 50 | 51 | 52 |
| --- | --- | --- | --- | --- | --- | --- | --- |
| Binder for negative electrode | Example 14 | Example 15 | Example 16 | Example 17 | Example 18 | Reference Example 4 | Reference Example 5 |
| Molecular weight (PAA, PAI) | 800,000 | 250,000 | 100,000 | 50,000 | 25,000 | 20,000 | 5,000 |
| Total solid content ratio (%) | 40 | 52 | 55 | 56.5 | 59 | 48 | 54 |
| Amount of residual solvents (%) | 8 | 4 | 3 | 3 | 2 | 3 | 1 |
| Initial discharge capacity (mAh/g) | 1605 | 1610 | 1602 | 1612 | 1612 | 1502 | 1486 |
| Initial charge capacity (mAh/g) | 1289 | 1290 | 1298 | 1293 | 1291 | 1096 | 1091 |
| Initial efficiency (%) | 80.3 | 80.1 | 80.4 | 80.2 | 80.1 | 72.9 | 73.4 |
| Cyclability (%) 30 cycles | 90.3 | 89.9 | 90.3 | 90.8 | 90.1 | 81.1 | 72.5 |

As shown in Table 14, a significant difference in the battery properties was not observed even in the case where the molecular weight of PAA was made different in Test Examples 46 to 50 utilizing Examples, which was similar to the results in Test 13. In contrast, the cyclability was lowered in Test Examples 51 and 52 utilizing Reference Examples as the molecular weight of PAI was lowered. From these results, it is suggested that lowering of the resin strength caused by lowering of the molecular weight be harder to occur in the polymer compounds obtained from the intermediate composition of Examples than in PAI.

In Test Examples 46 to 50 utilizing Examples, the amount of the residual solvents contained in the negative electrode Production of Electrode Sheets Slurries were each prepared by mixing the silicon material, natural graphite, acetylene black, and the NMP solution (binder for negative electrode) of the intermediate composition of Example 1 in the compounding ratio (mass ratio) shown in Table 15 and adding NMP to the resultant mixture. The subsequent steps are the same as in Test 5.

Evaluation of Batteries

Lithium ion rechargeable batteries were produced using the obtained electrode sheets, and the battery properties of the lithium ion rechargeable batteries were evaluated. The results are shown in Table 15. The method of producing a lithium ion rechargeable battery and the method of evaluating the battery properties of a lithium ion rechargeable battery are the same as the above-described method.

TABLE 15

| Test Example | 53 | 54 | 55 | 56 | 57 | 58 | 59 | 60 |
| --- | --- | --- | --- | --- | --- | --- | --- | --- |
| Negative electrode active material | 60 | 60 | 60 | 60 | 60 | 60 | 45 | 45 |
| Natural graphite | 24 | 22 | 20 | 18 | 15 | 10 | 40 | 39 |
| Acetylene black | 10 | 10 | 10 | 10 | 10 | 10 | 10 | 10 |
| Binder for negative electrode | 6 | 8 | 10 | 12 | 15 | 20 | 5 | 6 |
| Negative electrode active material/binder for negative electrode ratio | 9 | 7.5 | 6 | 5 | 4 | 3 | 9 | 7.5 |

TABLE 15-continued

| Test Example | 53 | 54 | 55 | 56 | 57 | 58 | 59 | 60 |
|---|---|---|---|---|---|---|---|---|
| Initial discharge capacity (mAh/g) | 1571 | 1538 | 1496 | 1488 | 1469 | 1443 | 1209 | 1366 |
| Initial charge capacity (mAh/g) | 963 | 1250 | 1207 | 1211 | 1199 | 1182 | 609 | 1098 |
| Initial efficiency (%) | 61.3 | 81.3 | 81.2 | 81.4 | 81.6 | 81.9 | 50.4 | 80.4 |
| Cyclability (%) 30 cycles | 61.4 | 81.4 | 86.7 | 91.2 | 90.8 | 87.7 | 49.2 | 81.2 |

As shown in Table 15, it was ascertained that the battery properties changed according to the compounding ratio of the negative electrode active material and the binder for a negative electrode. Particularly, it was ascertained that the initial efficiency and the cyclability were much improved in the case where the negative electrode active material/the binder for a negative electrode ratio was set to 7.5 or less, and that the cyclability was much improved in the case where the negative electrode active material/the binder for a negative electrode ratio was set in a range of 4 to 5.

<Test 16>

Next, changes in the characteristics of slurries and changes in the battery properties were evaluated for electrode sheets using a polymer compound according to the present embodiment as a binder for a negative electrode in the case where the particle diameter of acetylene black contained as a conductive aid was made different.

Production of Electrode Sheets

An NMP dispersion liquid of acetylene black was prepared by adding an acetylene black powder, polyvinylpyrrolidone (dispersant), and NMP in a pot of a planetary ball mill (LMZ 015 manufactured by Ashizawa Fintech Ltd.) and mixing them while pulverizing the acetylene black with the planetary ball mill. A plurality of NMP dispersion liquids each having a different particle diameter of the acetylene black were prepared by changing the treatment time with the planetary ball mill. The particle diameters (D10, D50, and D90) of the acetylene black in each NMP dispersion liquid are shown in Table 16.

Slurries were each prepared by mixing 72.5 parts by mass of the silicon material, the above-described NMP dispersion liquid corresponding to 13.5 parts by mass of acetylene black, and 14 parts by mass of the NMP solution of the intermediate composition of Example 1 and adding NMP to the resultant mixture. The subsequent steps are the same as in Test 5. The viscosity was measured for the prepared slurries, and the electrode resistance was measured for the obtained electrode sheets.

Evaluation of Batteries

Lithium ion rechargeable batteries were produced using the obtained electrode sheets, and the battery properties of the lithium ion rechargeable batteries were evaluated. The results are shown in Table 16. The method of producing a lithium ion rechargeable battery and the method of evaluating the battery properties of a lithium ion rechargeable battery are the same as the above-described method.

TABLE 16

| Test Example | 61 | 62 | 63 | 64 | 65 |
|---|---|---|---|---|---|
| D10 (μm) | 0.27 | 0.25 | 0.20 | 0.18 | 0.14 |
| D50 (μm) | 1.08 | 0.75 | 0.42 | 0.35 | 0.26 |
| D90 (μm) | 4.6 | 3.6 | 2.3 | 1.6 | 0.6 |
| Initial discharge capacity (mAh/g) | 1633 | 1629 | 1625 | 1627 | 1601 |
| Initial charge capacity (mAh/g) | 1311 | 1318 | 1308 | 1306 | 1268 |
| Initial efficiency (%) | 80.3 | 80.9 | 80.5 | 80.3 | 79.2 |
| Cyclability (%) 30 cycles | 84.3 | 90.2 | 93.5 | 91.1 | 83.2 |
| Electrode resistance (mΩ) | 45.6 | 40.1 | 38.8 | 40.4 | 63.2 |
| Viscosity of slurry (cP) | 1500 | 370 | 180 | 200 | 410 |

As shown in Table 16, it was ascertained that the battery properties changed according to the particle diameter of acetylene black. As the cause of lowering of the cyclability in Test Example 61 where the particle diameter of acetylene black is large, it is considered that the slurry used for producing the electrode had a high viscosity and a poor dispersing property. In Test Example 61, acetylene black to which pulverization with a planetary mill has not been conducted is used. As the cause of lowering of the initial efficiency and cyclability and increasing the electrode resistance in Test Example 65 where the particle diameter of acetylene black is small, it is considered that the pulverization with a planetary ball mill becomes excessive (to make overdispersion state), so that collapse of a structure in acetylene black and formation of a newly produced face progress and cutting of a conductive path or reaggregation occurs.

<Test 17>

Next, changes in the battery properties were evaluated for electrode sheets using a polymer compound according to the present embodiment as a binder for a negative electrode in the case where the compounding ratio of acetylene black contained as a conductive aid and the binder for a negative electrode was made different.

Production of Electrode Sheets

Slurries were each prepared by mixing the silicon material, natural graphite, acetylene black, and the NMP solution (binder for negative electrode) of the intermediate composition of Example 1 in the compounding ratio (mass ratio) shown in Table 17 and adding NMP to the resultant mixture. The subsequent steps are the same as in Test 5. Acetylene black having the same particle diameter as in Test Example 63 was used.

Evaluation of Batteries

Lithium ion rechargeable batteries were produced using the obtained electrode sheets, and the battery properties of the lithium ion rechargeable batteries were evaluated. The results are shown in Table 17. The method of producing a lithium ion rechargeable battery and the method of evaluating the battery properties of a lithium ion rechargeable battery are the same as the above-described method.

TABLE 17

| Test Example | 66 | 67 | 68 | 69 | 70 | 71 | 72 | 73 |
|---|---|---|---|---|---|---|---|---|
| Negative electrode active material | 60 | 60 | 60 | 60 | 60 | 60 | 60 | 60 |
| Natural graphite | 25 | 20 | 15 | 10 | 20 | 15 | 10 | 5 |
| Acetylene black | 5 | 10 | 15 | 20 | 5 | 10 | 15 | 20 |
| Binder for negative electrode | 10 | 10 | 10 | 10 | 15 | 15 | 15 | 15 |
| Acetylene black/binder for negative electrode ratio | 0.5 | 1.0 | 1.5 | 2.0 | 0.3 | 0.67 | 1.0 | 1.33 |
| Initial discharge capacity (mAh/g) | 1477 | 1496 | 1511 | 1529 | 1481 | 1469 | 1492 | 1522 |
| Initial charge capacity (mAh/g) | 1235 | 1207 | 1173 | 1151 | 1229 | 1199 | 1197 | 1177 |
| Initial efficiency (%) | 83.6 | 81.2 | 77.6 | 75.3 | 83.0 | 81.6 | 80.2 | 77.3 |
| Cyclability (%) 30 cycles | 83.4 | 86.7 | 86.4 | 91.2 | 74.1 | 90.8 | 91.8 | 91.6 |

As shown in Table 17, it was ascertained that the battery properties changed according to the compounding ratio of acetylene black and the binder for a negative electrode. Particularly, it was ascertained that the cyclability was much improved in the case where the acetylene black/the binder for a negative electrode ratio was set to 0.5 or more, and that the initial efficiency was much improved in the case where the same ratio was set to 1.5 or less.

<Test 18>

Next, changes in the battery properties were evaluated for electrode sheets using a polymer compound according to the present embodiment as a binder for a negative electrode in the case where a plurality of conductive aids were used together.

Production of Electrode Sheets

Slurries were each prepared by mixing the silicon material, natural graphite, acetylene black, a carbon nanotube, and the NMP solution (binder for negative electrode) of the intermediate composition of Example 1 in the compounding ratio (mass ratio) shown in Table 18 and adding NMP to the resultant mixture. Slurries were each prepared by mixing the silicon material, natural graphite, acetylene black, Ketjen black, and the NMP solution (binder for negative electrode) of the intermediate composition of Example 1 in the compounding ratio (mass ratio) shown in Table 19 and adding NMP to the resultant mixture. The subsequent steps are the same as in Test 5. Acetylene black having the same particle diameter as in Test Example 63 was used.

Evaluation of Batteries

Lithium ion rechargeable batteries were produced using the obtained electrode sheets, and the battery properties of the lithium ion rechargeable batteries were evaluated. The results are shown in Table 18. The method of producing a lithium ion rechargeable battery and the method of evaluating the battery properties of a lithium ion rechargeable battery are the same as the above-described method.

TABLE 18

| Test Example | 66 | 74 | 75 | 76 | 77 | 78 | 79 |
|---|---|---|---|---|---|---|---|
| Negative electrode active material | 60 | 60 | 60 | 60 | 60 | 60 | 60 |
| Natural graphite | 25 | 25 | 25 | 25 | 25 | 22.5 | 20 |
| Acetylene black | 5 | 4 | 3 | 2.5 | 2 | 5 | 0 |
| Carbon nanotube | 0 | 1 | 2 | 2.5 | 3 | 2.5 | 10 |
| Binder for negative electrode | 10 | 10 | 10 | 10 | 10 | 10 | 10 |
| Initial discharge capacity (mAh/g) | 1477 | 1488 | 1483 | 1499 | 1489 | 1501 | 1493 |
| Initial charge capacity (mAh/g) | 1235 | 1228 | 1226 | 1232 | 1220 | 1217 | 1217 |
| Initial efficiency (%) | 83.6 | 82.5 | 82.7 | 82.2 | 81.9 | 81.1 | 81.5 |
| Cyclability (%) 30 cycles | 83.4 | 85.6 | 87.6 | 88.0 | 84.5 | 88.3 | 79.1 |

As shown in Table 18, it was ascertained that the effect of improving the battery properties was also obtained in the case where acetylene black and a carbon nanotube were used together as a conductive aid. Particularly, it was ascertained that the cyclability was more improved in the case where the carbon nanotube was used together than in the case where acetylene black was used alone.

TABLE 19

| Test Example | 66 | 80 | 81 | 82 | 83 | 84 | 85 |
|---|---|---|---|---|---|---|---|
| Negative electrode active material | 60 | 60 | 60 | 60 | 60 | 60 | 60 |
| Natural graphite | 25 | 25 | 25 | 25 | 25 | 22.5 | 25 |
| Acetylene black | 5 | 4 | 3 | 2.5 | 2 | 5 | 0 |
| Ketjen black | 0 | 1 | 2 | 2.5 | 3 | 2.5 | 5 |
| Binder for negative electrode | 10 | 10 | 10 | 10 | 10 | 10 | 10 |
| Initial discharge capacity (mAh/g) | 1477 | 1485 | 1486 | 1492 | 1495 | 1501 | 1515 |
| Initial charge capacity (mAh/g) | 1235 | 1209 | 1190 | 1191 | 1184 | 1171 | 1129 |
| Initial efficiency (%) | 83.6 | 81.4 | 80.1 | 79.8 | 79.2 | 78.0 | 74.5 |
| Cyclability (%) 30 cycles | 83.4 | 86.6 | 88.2 | 88.9 | 85.1 | 85.7 | 87.9 |

As shown in Table 19, it was ascertained that the effect of improving the battery properties was also obtained in the case where acetylene black and Ketjen black were used together as a conductive aid. Particularly, it was ascertained that the cyclability was more improved in the case where Ketjen black was used together than in the case where acetylene black was used alone.

<Test 19>

Next, the battery properties were evaluated in the case where a polymer compound obtained by condensing PAA, a multifunctional amine having a structure satisfying the formula (1), and a multifunctional carboxylic acid was used as a binder for a negative electrode.

Example 19: PAA+1,2,3-Propanetricarboxylic Acid+4,4'-Diaminodiphenylmethane

PAA having a weight average molecular weight of 800,000 was dissolved in NMP to prepare a 10% by mass PAA/NMP solution, and 60 g (83.3 mmol in terms of monomer for PAA) of the PAA/NMP solution was taken out and placed in a flask under a nitrogen atmosphere. To the solution, 0.38 g (2.1 mmol) of 1,2,3-propanetricarboxylic acid were added, and the resultant mixture was stirred at room temperature for 30 minutes to prepare a PAA and carboxylic acid/NMP solution. Separately from the solution, 4.1 g (20.70 mmol) of 4,4'-diaminodiphenylmethane was dissolved in 5 ml of NMP to prepare an amine/NMP solution. The whole amount of the amine/NMP solution was dropped into the PAA and carboxylic acid/NMP solution while stirring the PAA and carboxylic acid/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 19 in a state of an NMP solution.

Example 20: PAA+Meso-1,2,3,4-Butanetetracarboxylic Acid+4,4'-Diaminodiphenylmethane PAA having a weight average molecular weight of 800,000 was dissolved in NMP to prepare a 10% by mass PAA/NMP solution, and 60 g (83.3 mmol in terms of monomer for PAA) of the PAA/NMP solution was taken out and placed in a flask under a nitrogen atmosphere. To the solution, 0.5 g (2.1 mmol) of 1,2,3-propanetricarboxylic acid were added, and the resultant mixture was stirred at room temperature for 30 minutes to prepare a PAA and carboxylic acid/NMP solution. Separately from the solution, 4.1 g (20.70 mmol) of 4,4'-diaminodiphenylmethane was dissolved in 5 ml of NMP to prepare an amine/NMP solution. The whole amount of the amine/NMP solution was dropped into the PAA and carboxylic acid/NMP solution while stirring the PAA and carboxylic acid/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 20 in a state of an NMP solution.

Example 21: PAA+Trimellitic Acid+4,4'-Diaminodiphenylmethane

PAA having a weight average molecular weight of 800,000 was dissolved in NMP to prepare a 10% by mass PAA/NMP solution, and 60 g (83.3 mmol in terms of monomer for PAA) of the PAA/NMP solution was taken out and placed in a flask under a nitrogen atmosphere. To the solution, 0.45 g (2.1 mmol) of trimellitic acid were added, and the resultant mixture was stirred at room temperature for 30 minutes to prepare a PAA and carboxylic acid/NMP solution. Separately from the solution, 4.1 g (20.70 mmol) of 4,4'-diaminodiphenylmethane was dissolved in 5 ml of NMP to prepare an amine/NMP solution. The whole amount of the amine/NMP solution was dropped into the PAA and carboxylic acid/NMP solution while stirring the PAA and carboxylic acid/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 21 in a state of an NMP solution.

Example 22: PAA+Pyromellitic Acid+4,4'-Diaminodiphenylmethane

PAA having a weight average molecular weight of 800,000 was dissolved in NMP to prepare a 10% by mass PAA/NMP solution, and 60 g (83.3 mmol in terms of monomer for PAA) of the PAA/NMP solution was taken out and placed in a flask under a nitrogen atmosphere. To the solution, 0.54 g (2.1 mmol) of pyromellitic acid were added, and the resultant mixture was stirred at room temperature for 30 minutes to prepare a PAA and carboxylic acid/NMP solution. Separately from the solution, 4.1 g (20.70 mmol) of 4,4'-diaminodiphenylmethane was dissolved in 5 ml of NMP to prepare an amine/NMP solution. The whole amount of the amine/NMP solution was dropped into the PAA and carboxylic acid/NMP solution while stirring the PAA and carboxylic acid/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 22 in a state of an NMP solution.

Production of Electrode Sheets

Slurries were each prepared by mixing 70 parts by mass of the silicon material, 15 parts by mass of natural graphite, 5 parts by mass of acetylene black, and 10 parts by mass of the NMP solution of the intermediate composition of each of Example 1-2 and Examples 19 to 22 and adding NMP to the resultant mixture. The silicon material is a silicon material made of a layered polysilane, which was used in Test 5. Each slurry was applied to the surface of 30 μm electrolytic copper foil as a collector in a film form using a doctor blade method. NMP in the slurry was volatilized and removed to form a negative electrode active material layer on the electrolytic copper foil. Subsequently, the electrolytic copper foil and the negative electrode active material layer were adhered firmly and joined by compressing the electrolytic copper foil and the negative electrode active material layer such that the thickness of the negative electrode active material layer was 20 μm with a roll press machine.

Thereafter, heating treatment was conducted in vacuum (under reduced pressure) at 180° C. for 2 hours to the negative electrode active material layer in a dried state after NMP was removed, so that the intermediate composition contained in the negative electrode active material layer was subjected to condensation reaction and the negative electrode active material layer was heated and cured. Thereby, electrode sheets each containing as a binder for a negative electrode a polymer compound having a crosslinked structure were obtained.

Evaluation of Battery Properties

Lithium ion rechargeable batteries were produced using the obtained electrode sheets, and the battery properties of the lithium ion rechargeable batteries were evaluated. The results are shown in Table 20. The method of producing a lithium ion rechargeable battery and the method of evaluating the battery properties of a lithium ion rechargeable battery are the same as the above-described method.

TABLE 20

| | Test Example | | | | |
|---|---|---|---|---|---|
| | 86 | 87 | 88 | 89 | 90 |
| | Binder for negative electrode | | | | |
| | Example 19 | Example 20 | Example 21 | Example 22 | Example 1-2 |
| Initial discharge capacity (mAh/g) | 1585 | 1588 | 1628 | 1599 | 1800 |
| Initial charge capacity (mAh/g) | 1279 | 1280 | 1251 | 1255 | 1287 |

TABLE 20-continued

| | Test Example | | | | |
|---|---|---|---|---|---|
| | 86 | 87 | 88 | 89 | 90 |
| | Binder for negative electrode | | | | |
| | Example 19 | Example 20 | Example 21 | Example 22 | Example 1-2 |
| Initial efficiency (%) | 80.7 | 80.6 | 79.8 | 78.5 | 80.8 |
| Cyclability (%) 30 cycles | 91.1 | 91.5 | 92.4 | 93.0 | 91.3 |

As shown in Table 20, the effect of improving the battery properties which was the same as in Test Example 90 utilizing Example 1-2 as a binder for a negative electrode was also obtained in Test Examples 86 to 89 utilizing Examples 19 to 22 respectively where a multifunctional carboxylic acid was condensed as a binder for a negative electrode. From the results in Test Examples 86 to 89, it was ascertained that there was a tendency that the initial efficiency was improved in the case where a multifunctional carboxylic acid containing a flexible chain structure was used (Test Examples 86 and 87) and that there was a tendency that the cyclability was improved in the case where a multifunctional carboxylic acid having a rigid cyclic structure was used (Test Examples 88 and 89). These results suggest that the properties of the polymer compound can be controlled by adding a crosslinked structure derived from a multifunctional carboxylic acid.

<Test 20>

Next, changes in the battery properties obtained when the compounding ratio of a multifunctional carboxylic acid was made different were evaluated in the case where a polymer compound obtained by condensing PAA, a multifunctional amine satisfying the formula (1), and a multifunctional carboxylic acid was used as a binder for a negative electrode.

Examples 20-1 to 20-5:
PAA+Meso-1,2,3,4-Butanetetracarboxylic
Acid+4,4'-Diaminodiphenylmethane Intermediate compositions of Examples 20-1 to 20-5 each having a different compounding ratio of a multifunctional carboxylic acid were obtained by making the amount of the multifunctional carboxylic acid blended different for the intermediate composition of Example 20. The amount of the multifunctional carboxylic acid in each example is as shown in the row of the multifunctional carboxylic acid in Table 21. Preparation was conducted in Examples 20-1 to 20-5 in the same manner as in Example 20 except that the amount of meso-1,2,3,4-butanetetracarboxylic acid as a multifunctional carboxylic acid blended was different.

Evaluation of Batteries

Electrode sheets using a polymer compound obtained from an intermediate composition as a negative electrode binder were produced using intermediate compositions of Examples 20-1 to 20-5. The method of producing an electrode sheet is the same as the method in Test 19. Lithium ion rechargeable batteries were produced using the obtained electrode sheets, and the battery properties of the lithium ion rechargeable batteries were evaluated. The results are shown in Table 21. The method of producing a lithium ion rechargeable battery and the method of evaluating the battery properties of a lithium ion rechargeable battery are the same as the above-described method.

TABLE 21

|  | Test Example | | | | |
|---|---|---|---|---|---|
|  | 91 | 92 | 93 | 94 | 95 |
|  | Binder for negative electrode | | | | |
|  | Example 22-1 | Example 22-2 | Example 22-3 | Example 22-4 | Example 22-5 |
| Multifunctional carboxylic acid (g) | 0.05 | 0.1 | 0.25 | 0.52 | 0.75 |
| Initial discharge capacity (mAh/g) | 1574 | 1584 | 1584 | 1588 | 1558 |
| Initial charge capacity (mAh/g) | 1273 | 1289 | 1283 | 1280 | 1259 |
| Initial efficiency (%) | 80.9 | 81.4 | 81.0 | 80.6 | 79.9 |
| Cyclability (%) 30 cycles | 91.5 | 91.4 | 91.7 | 91.5 | 92.7 |

As shown in Table 21, it was ascertained that there was a tendency that the initial efficiency was improved as the amount of the multifunctional carboxylic acid blended decreased. It is considered that the flexibility of crosslinked structures is enhanced when the amount of a crosslinked structure derived from the structure of the multifunctional carboxylic acid is small in the polymer compound, so that the intercalation and deintercalation of lithium occurs efficiently.

In contrast, it was ascertained that there was a tendency that the cyclability was improved as the amount of the multifunctional carboxylic acid blended increased. It is considered that crosslinked structures are strong when the amount of a crosslinked structure derived from the structure of the multifunctional carboxylic acid is large, so that the cyclability is enhanced.

From these results, it is suggested that, in the case where a crosslinked structure derived from a multifunctional carboxylic acid is added, control of the crosslinked structure to be a certain amount or less be preferable.

<Test 21>

Next, the battery properties were evaluated in the case where polymer compounds obtained by condensing PAA, a multifunctional amine having a structure satisfying the formula (1), and a monoamine were used as a binder for a negative electrode.

Example 23: PAA+4,4'-Diaminodiphenylmethane+ Aniline

PAA having a weight average molecular weight of 800,000 was dissolved in NMP to prepare a 10% by mass PAA/NMP solution, and 60 g (83.3 mmol in terms of monomer for PAA) of the PAA/NMP solution was taken out and placed in a flask under a nitrogen atmosphere. Separately from the solution, 4.1 g (20.70 mmol) of 4,4'-diaminodiphenylmethane and 251 mg (0.207 mmol) of aniline was dissolved in 5 ml of NMP to prepare a mixed amine/NMP solution. The whole amount of the mixed amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 23 in a state of an NMP solution.

Example 24: PAA+4,4'-Diaminodiphenylmethane+ Aminophenol

PAA having a weight average molecular weight of 800,000 was dissolved in NMP to prepare a 10% by mass PAA/NMP solution, and 60 g (83.3 mmol in terms of monomer for PAA) of the PAA/NMP solution was taken out and placed in a flask under a nitrogen atmosphere. Separately from the solution, 4.1 g (20.70 mmol) of 4,4'-diaminodiphenylmethane and 226 mg (0.207 mmol) of aminophenol was dissolved in 5 ml of NMP to prepare a mixed amine/NMP solution. The whole amount of the mixed amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 24 in a state of an NMP solution.

Example 25: PAA+4,4'-Diaminodiphenylmethane+ Morpholine

PAA having a weight average molecular weight of 800,000 was dissolved in NMP to prepare a 10% by mass PAA/NMP solution, and 60 g (83.3 mmol in terms of monomer for PAA) of the PAA/NMP solution was taken out and placed in a flask under a nitrogen atmosphere. Separately from the solution, 4.1 g (20.70 mmol) of 4,4'-diaminodiphenylmethane and 180 mg (0.207 mmol) of morpholine were dissolved in 5 ml of NMP to prepare a mixed amine/NMP solution. The whole amount of the mixed amine/NMP solution was dropped into the PAA/NMP solution while stirring the PAA/NMP solution in the flask, and stirring was continued at room temperature for 30 minutes. Thereafter, heating treatment (preheating treatment) was conducted at 130° C. for 3 hours with a Dean-Stark apparatus to obtain an intermediate composition of Example 25 in a state of an NMP solution.

Production of Electrode Sheets

Slurries were each prepared by mixing 70 parts by mass of the silicon material, 15 parts by mass of natural graphite, 5 parts by mass of acetylene black, and 10 parts by mass of the NMP solution of the intermediate composition of each of Example 1-2 and Examples 23 to 25 and adding NMP to the resultant mixture. The silicon material is a silicon material made of a layered polysilane, which was used in Test 5. Each slurry was applied to the surface of 30 μm electrolytic copper foil as a collector in a film form using a doctor blade method. NMP in the slurry was volatilized and removed to form a negative electrode active material layer on the electrolytic copper foil. Subsequently, the electrolytic copper foil and the negative electrode active material layer were adhered firmly and joined by compressing the electrolytic copper foil and the negative electrode active material layer such that the thickness of the negative electrode active material layer was 20 μm with a roll press machine.

Thereafter, heating treatment was conducted in vacuum (under reduced pressure) at 180° C. for 2 hours to the negative electrode active material layer in a dried state after NMP was removed, so that the intermediate composition contained in the negative electrode active material layer was subjected to condensation reaction and the negative electrode active material layer was heated and cured. Thereby, electrode sheets each containing as a binder for a negative electrode a polymer compound having a crosslinked structure were obtained.

Evaluation of Battery Properties

Lithium ion rechargeable batteries were produced using the obtained electrode sheets, and the battery properties of the lithium ion rechargeable batteries were evaluated. The results are shown in Table 22. The method of producing a lithium ion rechargeable battery and the method of evaluating the battery properties of a lithium ion rechargeable battery are the same as the above-described method.

TABLE 22

|  | Test Example | | | |
| --- | --- | --- | --- | --- |
|  | 96 | 97 | 98 | 90 |
|  | Binder for negative electrode | | | |
|  | Example 23 | Example 24 | Example 25 | Example 1-2 |
| Initial discharge capacity (mAh/g) | 1811 | 1821 | 1855 | 1800 |
| Initial charge capacity (mAh/g) | 1481 | 1490 | 1535 | 1287 |
| Initial efficiency (%) | 81.8 | 81.8 | 82.7 | 80.8 |
| Cyclability (%) 30 cycles | 90.7 | 90.9 | 90.3 | 91.3 |

As shown in Table 22, the effect of improving the battery properties which was the same as or higher than in Test Example 90 utilizing Example 1-2 as a binder for a negative electrode was also obtained in Test Examples 96 to 98 utilizing Examples 23 to 25 respectively where a monoamine was condensed as a binder for a negative electrode. Particularly, it was ascertained that there was a tendency that Test Examples 96 to 98 utilizing Examples 23 to 25 respectively where a monoamine was condensed showed a higher initial efficiency than Test Example 90 utilizing Example 1-2. It is considered that the tendency is due to the following mechanism. That is, in the molecular structure of the polymer compound, a monoamine is bound to a carboxy group to reduce free carboxy groups and suppress the aggregation of the polymer compound attributable to the hydrogen bond of carboxy groups. Thereby, the permeability of a lithium ion is enhanced and the intercalation and deintercalation of lithium occurs efficiently.

From these results, it was ascertained that the battery properties could be controlled not only by adjusting the number of crosslinks based on the carboxy groups/amino groups ratio as shown in Test 2 but also by binding a monoamine to a carboxy group to terminate carboxy groups chemically and reduce hydrogen bonds in the polymer compound.

The invention claimed is:

1. A method for producing a negative electrode of an electrical storage device, comprising forming a negative electrode active material layer to a collector using a slurry for a negative electrode, the slurry comprising:
    an intermediate composition for a polymer compound for use as a binder for a negative electrode of an electrical storage device;
    a negative electrode active material; and
    a solvent, wherein the negative electrode active material is at least one selected from carbon-based materials capable of intercalating and deintercalating lithium, elements capable of producing alloy with lithium, and compounds including an element capable of producing alloy with lithium; and wherein the intermediate composition comprises:
polyacrylic acid;
a multifunctional amine represented by the following formula (1); and
a nonaqueous solvent, wherein
Y represents a straight chain alkyl group having 1 to 4 carbon atoms, a phenylene group, or an oxygen atom, and
R1 and R2 each independently represent one or more hydrogen atoms, methyl groups, ethyl groups, trifluoromethyl groups, or methoxy groups

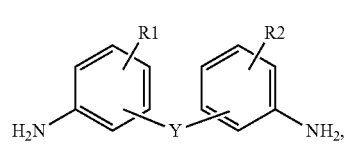

(1)

wherein, prior to being incorporated into the slurry, the intermediate layer is subjected to a preheating treatment at a temperature of 40° C. to 140° C.

2. The method for producing a negative electrode according to claim 1, wherein the slurry for a negative electrode includes at least one selected from: silicon materials obtained from $CaSi_2$ through decalcification reaction; Si; and $SiO_v$ (0<v<2).

3. The method for producing a negative electrode according to claim 1, wherein a compounding ratio of the polyacrylic acid and the multifunctional amine is made such that carboxy groups in the polyacrylic acid is 1.5 to 15 equivalents in relation to 1 equivalent of amino groups in the multifunctional amine.

4. A method for producing a negative electrode of an electrical storage device, comprising:
    a preheating step of preheating an intermediate composition at a temperature of 40° C. to 140° C., the intermediate composition comprising:
polyacrylic acid;
a multifunctional amine represented by the following formula (1); and
a nonaqueous solvent, wherein
Y represents a straight chain alkyl group having 1 to 4 carbon atoms, a phenylene group, or an oxygen atom, and
R1 and R2 each independently represent one or more hydrogen atoms, methyl groups, ethyl groups, trifluoromethyl groups, or methoxy groups

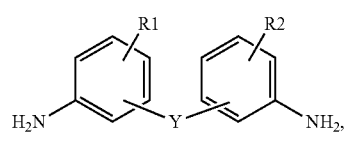

(1)

an active material layer-forming step of forming a negative electrode active material layer on a collector using a mixture including the intermediate composition and a negative electrode active material; and
a condensation step of condensing the polyacrylic acid and the multifunctional amine by heat-treating the negative electrode active material layer.

5. The method for producing a negative electrode according to claim 4, comprising drying and heat-treating the negative electrode active material layer in the condensation step.

6. The method for producing a negative electrode according to claim 4, wherein a compounding ratio of the polyacrylic acid and the multifunctional amine is made such that carboxy groups in the polyacrylic acid is 1.5 to 15 equivalents in relation to 1 equivalent of amino groups in the multifunctional amine.

* * * * *